United States Patent
Nakane

(10) Patent No.: US 9,821,347 B2
(45) Date of Patent: Nov. 21, 2017

(54) OPTICAL CONNECTOR CLEANING TOOL AND OPTICAL CONNECTOR CLEANING METHOD

(71) Applicant: FUJIKURA LTD., Koto-ku, Tokyo (JP)

(72) Inventor: Junichi Nakane, Sakura (JP)

(73) Assignee: FUJIKURA LTD., Tokyo (JP)

( * ) Notice: Subject to any disclaimer, the term of this patent is extended or adjusted under 35 U.S.C. 154(b) by 653 days.

(21) Appl. No.: 14/169,871

(22) Filed: Jan. 31, 2014

(65) Prior Publication Data

US 2014/0144468 A1 May 29, 2014

Related U.S. Application Data

(63) Continuation of application No. PCT/JP2013/071540, filed on Aug. 8, 2013.

(30) Foreign Application Priority Data

Aug. 9, 2012 (JP) .................. 2012-177410
Aug. 9, 2012 (JP) .................. 2012-177411
Aug. 9, 2012 (JP) .................. 2012-177412

(51) Int. Cl.
*B08B 1/00* (2006.01)
*G02B 6/38* (2006.01)
*B65H 37/00* (2006.01)

(52) U.S. Cl.
CPC .............. *B08B 1/008* (2013.01); *B08B 1/006* (2013.01); *B65H 37/007* (2013.01);
(Continued)

(58) Field of Classification Search
CPC ....... B08B 1/00; B08B 11/00; B08B 2240/02; B08B 1/006; B08B 1/008; G02B 6/36;
(Continued)

(56) References Cited

U.S. PATENT DOCUMENTS

2010/0043159 A1 2/2010 Fujiwara
2014/0259481 A1* 9/2014 Fujiwara .............. G02B 6/3866
15/103.5

FOREIGN PATENT DOCUMENTS

CN 1165959 A 11/1997
EP 2116880 A1 11/2009
(Continued)

OTHER PUBLICATIONS

Japanese Office Action for JP 2012-177410, dated Sep. 11, 2013.
(Continued)

*Primary Examiner* — Saeed T Chaudhry

(74) *Attorney, Agent, or Firm* — Osha Liang LLP

(57) ABSTRACT

Disclosed is an optical connector cleaning tool including: a tool body; and an extended part that extends from the tool body and that has a head for pressing a cleaning element against an optical connector, the extended part being provided so as to be movable with respect to the tool body. The optical connector is cleaned with the cleaning element by moving the tool body toward the extended part in a state where the cleaning element is pressed against the optical connector with the head. The tool body includes: a take-up reel that, in accordance with the movement of the tool body with respect to the extended part, takes up the cleaning element which has been sent out from the head; and a take-up amount adjustment mechanism that makes constant the take-up amount of the take-up reel per single cleaning operation.

9 Claims, 21 Drawing Sheets

(52) U.S. Cl.
CPC .............. *G02B 6/3866* (2013.01); *B08B 1/00* (2013.01); *B08B 2240/02* (2013.01)

(58) Field of Classification Search
CPC .... G02B 6/381; G02B 6/3817; G02B 6/3866; G02B 6/3869; B65H 37/007
See application file for complete search history.

(56) References Cited

FOREIGN PATENT DOCUMENTS

| | | |
|---|---|---|
| JP | 2012-063691 A | 3/2012 |
| JP | 2012166342 A | 9/2012 |
| WO | 2008/108278 A | 9/2008 |
| WO | 2010/147143 A1 | 12/2010 |

OTHER PUBLICATIONS

Japanese Office Action for JP 2012-177411, dated Sep. 11, 2013.
Japanese Office Action for JP 2012-177412, dated Sep. 11, 2013.
Japanese Office Action for JP 2012-177412, dated Oct. 22, 2013.
Communication dated May 29, 2015 from the European Patent Office in counterpart application No. 13827801.5.

\* cited by examiner

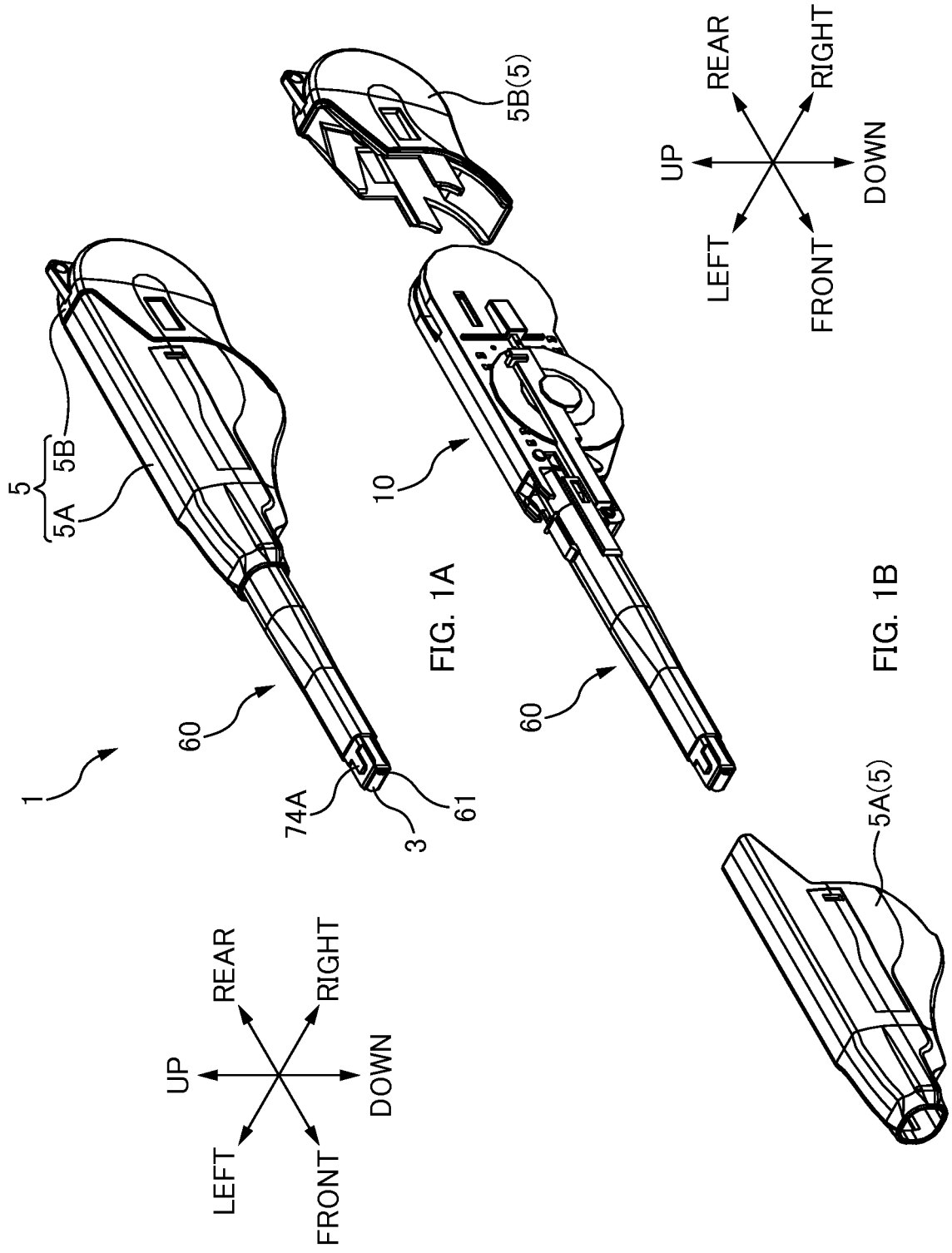

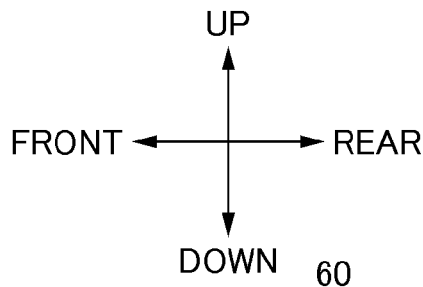
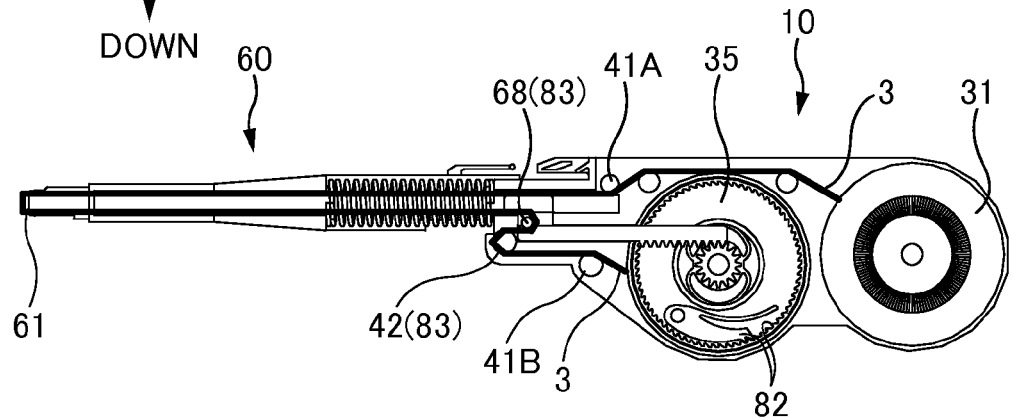
FIG. 7A
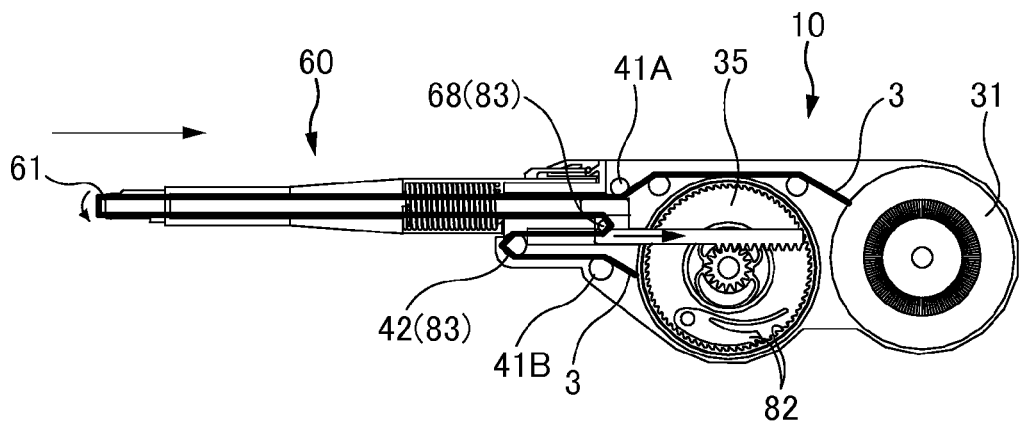
FIG. 7B
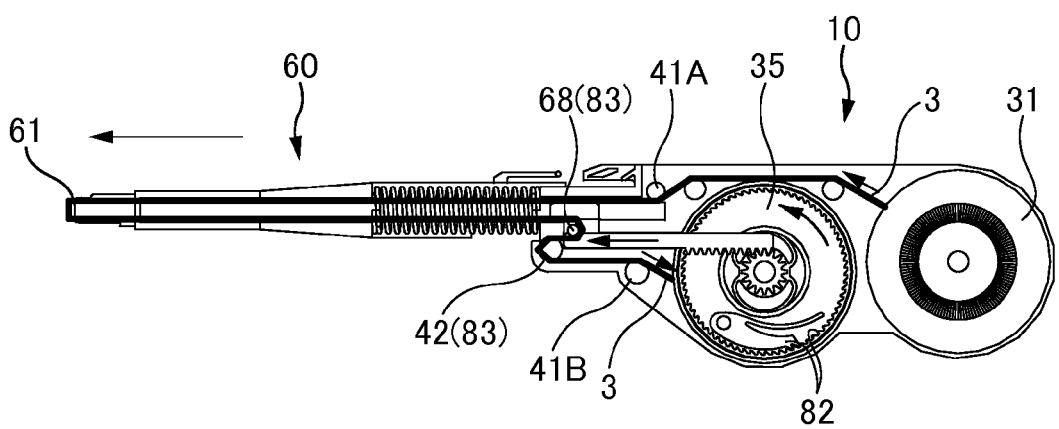
FIG. 7C

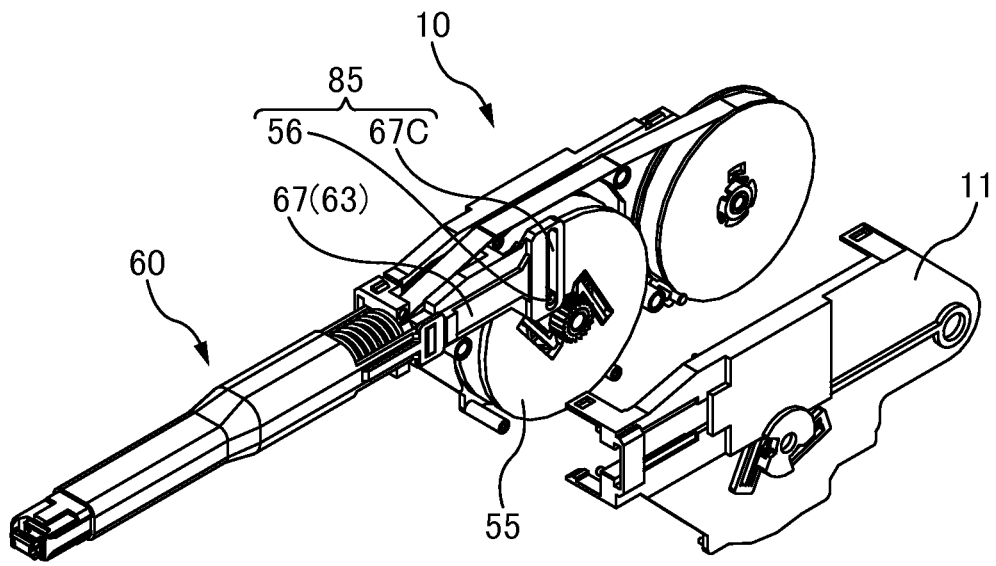
FIG. 16A (NORMAL STATE)
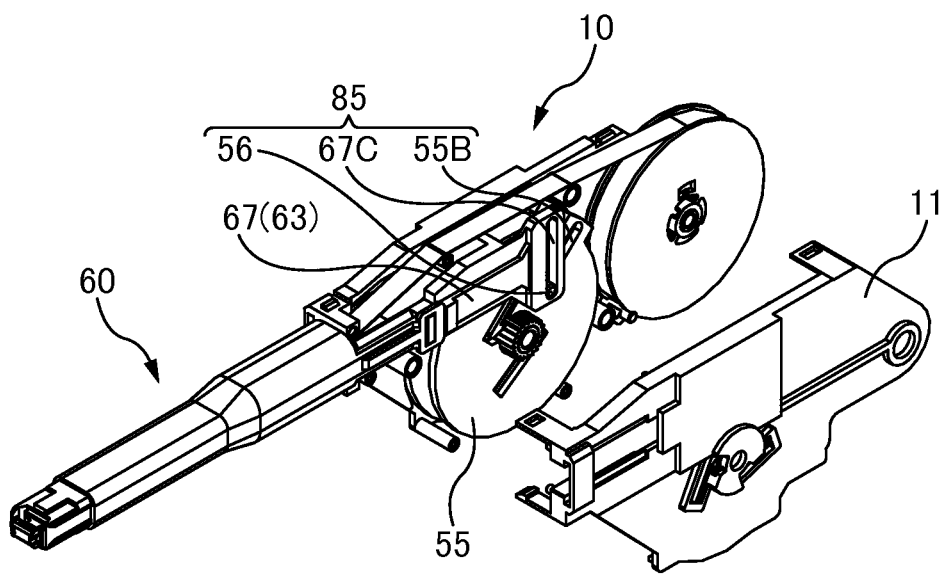
FIG. 16B (PUSHED STATE)

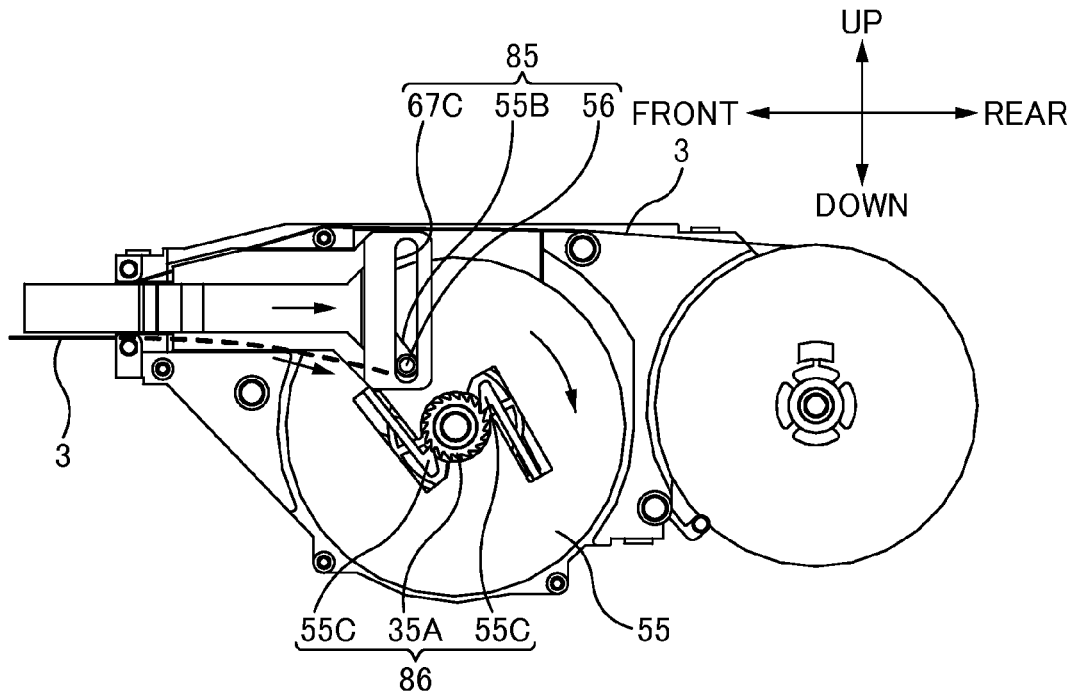
FIG. 19A (DURING PUSHING OPERATION)
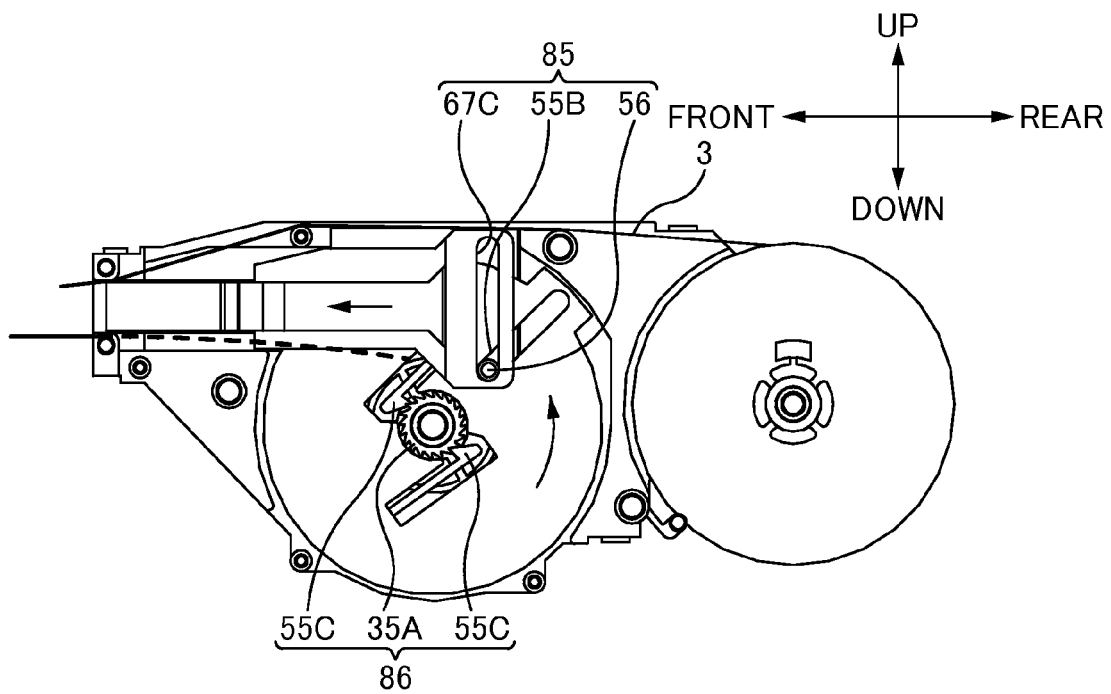
FIG. 19B (DURING PULLING OPERATION)

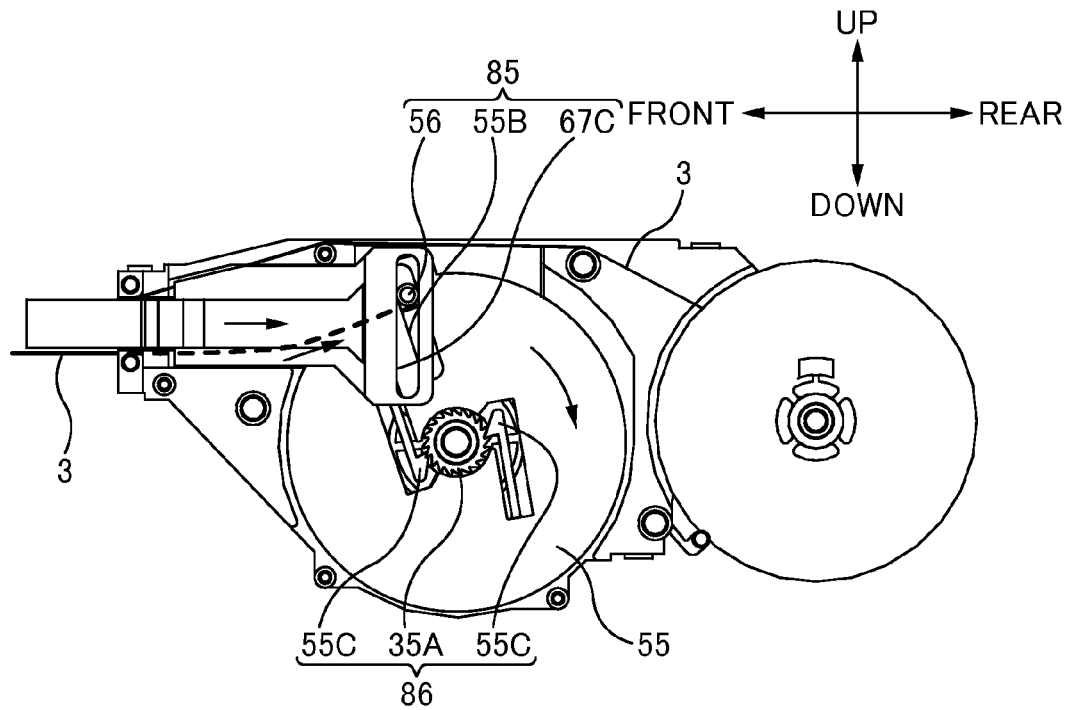
FIG. 20A (DURING PUSHING OPERATION; LARGE OUTER DIAMETER)
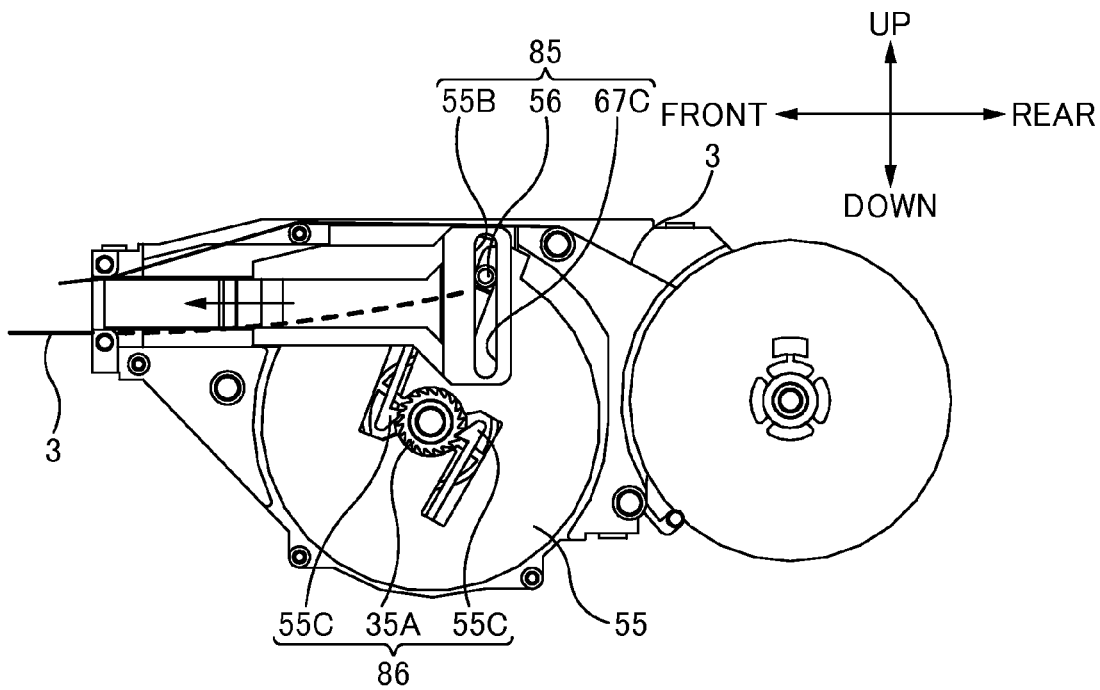
FIG. 20B (DURING PULLING OPERATION; LARGE OUTER DIAMETER)

OPTICAL CONNECTOR CLEANING TOOL AND OPTICAL CONNECTOR CLEANING METHOD

TECHNICAL FIELD

The present invention relates to an optical connector cleaning tool and an optical connector cleaning method.

BACKGROUND ART

Optical connectors are connected together by abutting the end surfaces of optical fibers against one another at the joining end surfaces of the respective optical connectors. Soil/dust on the joining end surface of an optical connector or the end surface of an optical fiber causes damage to the optical connector and/or the optical fiber at the time of attachment/detachment, or causes an increase in transmission loss. Thus, the joining end surfaces of optical connectors are cleaned by using an optical connector cleaning tool.

Patent Literature 1 describes an optical connector cleaning tool including: a tool body in which a supply reel and a take-up reel for supplying/taking up a cleaning element are incorporated; and an extended part (insertion part) having a head for pressing the cleaning element against the joining end surface of an optical connector. With this optical connector cleaning tool, it is possible to wipe the joining end surface of the optical connector with the cleaning element by moving the tool body with respect to the extended part in a state where the cleaning element is pressed against the optical connector with the head.

In the optical connector cleaning tool described in Patent Literature 1, the cleaning element is taken up by the take-up reel by making the take-up reel rotate by employing the relative movement between the tool body and the extended part. An amount of cleaning element equivalent to the amount taken up by the take-up reel is supplied from the supply reel and is used at the head.

It should be noted that Patent Literature 2 to Patent Literature 4 also describe optical connector cleaning tools.

CITATION LIST

Patent Literature

Patent Literature 1: Japanese Patent No. 4579330
Patent Literature 2: JP-A-2012-53270
Patent Literature 3: JP-A-2008-46218
Patent Literature 4: JP-A-2000-284147

SUMMARY OF INVENTION

Technical Problem

As the outer diameter of the cleaning element taken up by the take-up reel increases, the amount of cleaning element taken up by the rotating reel also increases, even if the rotation amount (the angle of rotation) of the take-up reel is the same. So, with a structure in which the cleaning element is taken up by rotating the take-up reel by a constant rotation amount, the amount of cleaning element used for a single cleaning operation will increase along with the increase in the outer diameter of the take-up reel. This results in a problem that the amount of cleaning element used for a single cleaning operation increases with the increase in the number of times the tool is used.

An objective of the present invention is to suppress the amount of cleaning element that is taken up, even when the outer diameter of the cleaning element on the take-up reel becomes large.

Solution to Problem

A primary aspect of the invention for achieving the aforementioned objective is an optical connector cleaning tool including: a tool body; and an extended part that extends from the tool body and that has a head for pressing a cleaning element against an optical connector, the extended part being provided so as to be movable with respect to the tool body. The tool body includes: a take-up reel that, in accordance with the movement of the tool body with respect to the extended part, takes up the cleaning element which has been sent out from the head; and a take-up amount adjustment mechanism that makes constant the take-up amount of the take-up reel per single cleaning operation. The optical connector is cleaned with the cleaning element by moving the tool body toward the extended part in a state where the cleaning element is pressed against the optical connector with the head.

Other features of the present invention will be made clear by the Description and Drawings below.

Advantageous Effects of Invention

With the present invention, the amount of cleaning element that is taken up can be suppressed, even when the outer diameter of the cleaning element on the take-up reel becomes large.

BRIEF DESCRIPTION OF DRAWINGS

FIG. 1A is a perspective view of an optical connector cleaning tool of a first embodiment. FIG. 1B is a perspective view thereof with the cover 5 removed.

FIGS. 7A to 7C are explanatory diagrams of operations of the constant-amount feeding mechanism 83. FIG. 7A is an explanatory diagram of the normal state before the pushing operation. FIG. 7B is an explanatory diagram of the constant-amount feeding mechanism 83 in the pushed state. FIG. 7C is an explanatory diagram in the normal state after the pulling operation.

FIG. 8A is an explanatory diagram during the pushing operation. FIG. 8B is an explanatory diagram during the pulling operation.

FIG. 14A is an explanatory diagram during the pushing operation. FIG. 14B is an explanatory diagram during the pulling operation.

FIGS. 16A and 16B are perspective views with the right housing 11 of the tool body 10 removed. FIG. 16A is a perspective view in the normal state, and FIG. 16B is a perspective view in the pushed state.

FIG. 19A is an explanatory diagram during the pushing operation in the fourth embodiment. FIG. 19B is an explanatory diagram during the pulling operation.

FIGS. 20A and 20B are explanatory diagrams of operations when the outer diameter of the cleaning element 3 on the take-up reel 35 is large. FIG. 20A is an explanatory diagram during the pushing operation, and FIG. 20B is an explanatory diagram during the pulling operation.

FIG. 21A is an explanatory diagram of the take-up amount when the outer diameter of the cleaning element 3 on the take-up reel 35 is small. FIG. 21B is an explanatory diagram of the take-up amount when the outer diameter of the cleaning element 3 on the take-up reel 35 is large.

DESCRIPTION OF EMBODIMENTS

Figure 2A:
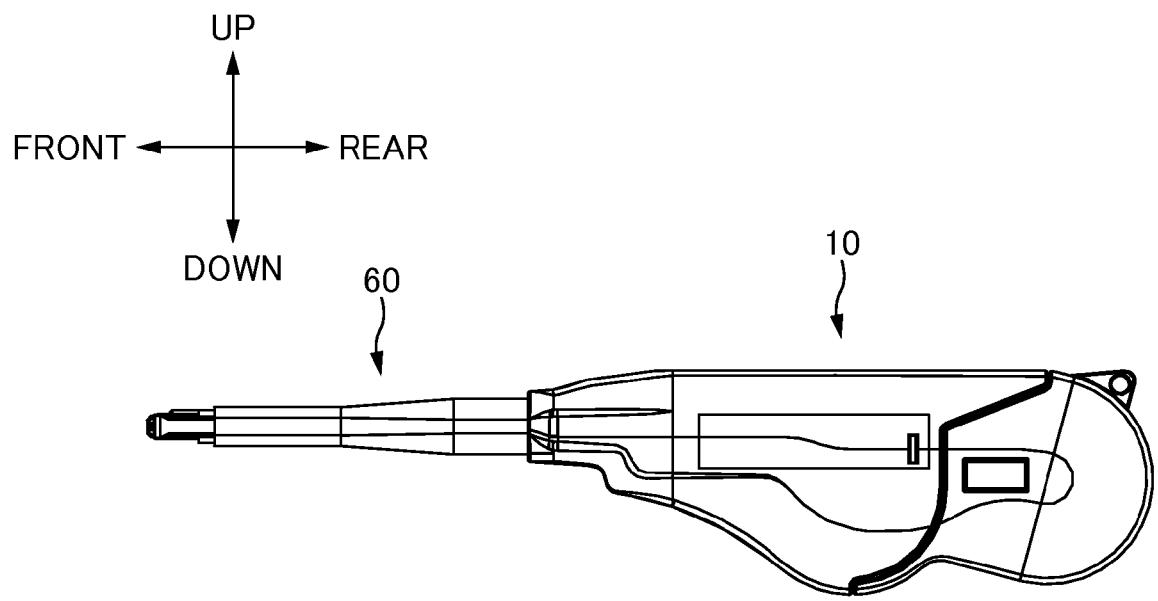
FIG. 2A is a side view of the cleaning tool 1 in its normal state.

At least the following matters are made clear from the Description and Drawings described below.

Disclosed is an optical connector cleaning tool including a tool body, and an extended part that extends from the tool body and that has a head for pressing a cleaning element against an optical connector, the extended part being provided so as to be movable with respect to the tool body, wherein: the tool body includes a take-up reel that, in accordance with the movement of the tool body with respect to the extended part, takes up the cleaning element which has been sent out from the head, and a take-up amount adjustment mechanism that makes constant the take-up amount of the take-up reel per single cleaning operation; and the optical connector is cleaned with the cleaning element by moving the tool body toward the extended part in a state where the cleaning element is pressed against the optical connector with the head.

With this optical connector cleaning tool, the amount of cleaning element that is taken up can be suppressed, even when the outer diameter of the cleaning element on the take-up reel becomes large.

It is preferable that: the optical connector cleaning tool includes a conversion mechanism that converts relative linear motion between the tool body and the extended part into rotary motion; and the take-up amount adjustment mechanism is a friction transmission mechanism that transmits rotary force of the rotary motion converted by the conversion mechanism to the take-up reel by friction force between a friction member and a friction surface. In this way, the amount of cleaning element that is taken up can be suppressed, even when the outer diameter of the cleaning element on the take-up reel becomes large.

(1)

Also disclosed is an optical connector cleaning tool including a tool body having a take-up reel for taking up a cleaning element, and an extended part that extends from the tool body and that has a head for pressing the cleaning element against an optical connector, the extended part being provided so as to be movable with respect to the tool body, wherein: the optical connector is cleaned with the cleaning element by moving the tool body toward the extended part in a state where the cleaning element is pressed against the optical connector with the head; and the optical connector cleaning tool further includes a conversion mechanism that converts relative linear motion between the tool body and the extended part into rotary motion, and a friction transmission mechanism that transmits rotary force of the rotary motion converted by the conversion mechanism to the take-up reel by friction force between a friction member and a friction surface.

With this optical connector cleaning tool, the amount of cleaning element that is taken up can be suppressed, even when the outer diameter of the cleaning element on the take-up reel becomes large.

It is preferable that slippage occurs between the friction member and the friction surface of the friction transmission mechanism in a case where predetermined tension acts upon the cleaning element when the tool body moves with respect to the extended part in a manner such that the rotary motion is in a direction that makes the take-up reel rotate in a take-up direction. In this way, the rotation amount (the angle of rotation) of the take-up reel decreases by the amount of occurrence of slippage between the friction member and the friction surface, and thus, the amount of cleaning element taken up by the take-up reel can be suppressed.

It is preferable that: the optical connector cleaning tool further includes a constant-amount feeding mechanism that makes constant the amount of the cleaning element fed to the head by a single cleaning operation; and the amount of the cleaning element taken up by the take-up reel is made constant due to the occurrence of slippage between the friction member and the friction surface of the friction transmission mechanism when the tool body moves with respect to the extended part in a manner such that the rotary motion is in a direction that makes the take-up reel rotate in the take-up direction. In this way, the amount of cleaning element that is taken up can be made constant, even when the outer diameter of the cleaning element on the take-up reel becomes large.

It is preferable that: the tool body includes a body-side engagement part; the extended part includes a head-side engagement part; the cleaning element is stretched between the head-side engagement part and the body-side engagement part; when the tool body is moved toward the extended part, an amount of the cleaning element equivalent to the amount of movement is supplied to the head as a result of the head-side engagement part and the body-side engagement part being separated from one another; and when the head-side engagement part and the body-side engagement part near one another, slippage occurs between the friction member and the friction surface of the friction transmission mechanism and an amount of the cleaning element equivalent to the amount of movement is taken up by the take-up reel. In this way, the amount of cleaning element taken up by the take-up reel can be made constant.

It is preferable that: the optical connector cleaning tool further includes a restriction mechanism that allows the take-up reel to rotate in a take-up direction in which the cleaning element is taken up, and that restricts the take-up reel from rotating in an opposite direction from the take-up direction; and the restriction mechanism restricts the take-up reel from rotating in the opposite direction and slippage occurs between the friction member and the friction surface of the friction transmission mechanism when the tool body moves with respect to the extended part in a manner such that the rotary motion is in a direction that makes the take-up reel rotate in the opposite direction. In this way, the tool body can move with respect to the extended part in a manner so as to make the take-up reel rotate in the opposite direction from the take-up direction.

It is preferable that: the conversion mechanism is a rack-and-pinion mechanism; the extended part includes a rack that constitutes the rack-and-pinion mechanism; and the friction member constituting the friction transmission mechanism is provided to a pinion that constitutes the rack-and-pinion mechanism. In this way, it is possible to allow the take-up reel to rotate in the take-up direction, in which the cleaning element is taken up, and to restrict the take-up reel from rotating in the opposite direction from the take-up direction.

It is preferable that: the rotation axis of the pinion is coaxial with the rotation axis of the take-up reel; and at least two of the friction members are provided so as to be rotationally symmetric about the rotation axis of the pinion. In this way, friction force acts evenly upon the two or more friction members.

Also disclosed is an optical connector cleaning method involving: (1) by using an optical connector cleaning tool including a tool body having a take-up reel for taking up a cleaning element, an extended part that extends from the tool body and that has a head for pressing the cleaning element against an optical connector and that is provided so as to be movable with respect to the tool body, a conversion mechanism that converts relative linear motion between the tool body and the extended part into rotary motion, and a friction transmission mechanism that transmits rotary force of the rotary motion converted by the conversion mechanism to the take-up reel by friction force between a friction member and a friction surface, pressing the cleaning element against the optical connector with the head; and (2) cleaning the optical connector with the cleaning element by moving the tool body toward the extended part in a state where the cleaning element is pressed against the optical connector with the head.

With this optical connector cleaning method, the amount of cleaning element that is taken up can be suppressed, even when the outer diameter of the cleaning element on the take-up reel becomes large.

(2)

Incidentally, at the time of cleaning the joining end surface of an optical connector with an optical connector cleaning tool, a sufficient cleaning effect cannot be obtained if the operation of moving the cleaning tool with respect to the extended part (also referred to as "pushing operation") is performed improperly. In view thereof, there are examples in which an operator is enabled to confirm that the pushing operation was completed properly by providing a collision sound generating mechanism that includes a cantilever and a collision surface between the tool body and the extended part, and by generating a collision sound when the pushing operation is completed. However, conventional collision sound generating mechanisms have a drawback in that the cantilever is prone to breakage due to the large stress applied to the cantilever at the time of movement. On the other hand, an attempt to increase the durability of the cantilever will make it difficult to render the collision sound generating mechanism compact in size, resulting in an increase in the overall size of the optical connector cleaning tool.

To address these drawbacks, an objective of a second aspect of the invention is to provide an optical connector cleaning tool including a collision sound generating mechanism that is compact in size and is less prone to breakage.

A primary second aspect of the invention for achieving the aforementioned objective is an optical connector cleaning tool including a tool body, and an extended part that extends from the tool body and that has a head for pressing a cleaning element against an optical connector, the extended part being provided so as to be movable with respect to the tool body in a predetermined direction of movement, wherein: the optical connector is cleaned with the cleaning element by moving the tool body toward the extended part in a state where the cleaning element is pressed against the optical connector with the head; a cantilever arranged along the aforementioned direction of movement is provided to either one of the tool body and the extended part; a guide that displaces an end part of the cantilever, and a collision surface for generating a collision sound by making the end part of the cantilever collide therewith are provided on the other one of the tool body and the extended part; and when the tool body is moved in a direction toward the extended part, the end part of the cantilever is displaced by the guide in a direction intersecting with the aforementioned direction of movement, and when the end part of the cantilever disengages from the guide, the end part collides with the collision surface due to elastic force of the cantilever and generates a collision sound.

With this optical connector cleaning tool, it is possible to achieve a collision sound generating mechanism that is compact in size and is less prone to breakage.

It is preferable that, when the tool body is moved in an opposite direction from the direction toward the extended part, the end part of the cantilever is displaced toward the opposite side by the guide. In this way, fatiguing of the cantilever can be reduced by keeping the amount of displacement of the cantilever as small as possible, and thus, damage can be suppressed easily.

It is preferable that the amount of displacement of the end part when the tool body is moved in the opposite direction from the direction toward the extended part is smaller than the amount of displacement of the end part when the tool body is moved in the direction toward the extended part. In this way, the amount of displacement of the cantilever during the pulling operation is made smaller than the amount of displacement of the cantilever during the pushing operation, and thus, damage can be suppressed more easily.

It is preferable that: the guide is provided so as to have a slope with a predetermined angle in the up-and-down direction; and the sloping angle of the slope on the rear side in the direction of movement of the cantilever is smaller than the sloping angle of the slope on the front side in the direction of movement of the cantilever. In this way, wearing of the guide's surface and the colliding part of the cantilever can be suppressed, and breakage of the cantilever can be suppressed by adjusting the amount of warpage of the cantilever in the up-and-down direction.

It is preferable that the guide is provided with a space, which is for the reverberation of the collision sound, on the opposite side of the collision surface from the face with which the end part of the cantilever collides. In this way, the collision sound can be generated in a loudness that can be heard by the operator.

It is preferable that, when the guide moves the tool body in the direction toward the extended part or in the opposite direction therefrom, both side ends of the cantilever are supported by the guide. In this way, the cantilever moves in a state where both ends thereof are supported during the pushing operation and the pulling operation, and thus, the operation can be stabilized.

Also disclosed is an optical connector cleaning method involving: moving a cleaning tool toward an extended part that is provided so as to be movable with respect to the tool body in a predetermined direction of movement in a state where a cleaning element is pressed against an optical connector with a head for pressing the cleaning element against the optical connector; displacing, with a guide provided on either one of the tool body and the extended part, the end part of a cantilever provided on the other one of the tool body and the extended part in a direction intersecting with the aforementioned direction of movement when the tool body is moved in a direction toward the extended part; and, when the end part of the cantilever disengages from the guide, generating a collision sound by making the end part of the cantilever collide with a collision surface, which is for generating a collision sound by making the end part collide therewith, due to elastic force of the cantilever.

(3)

As the outer diameter of the cleaning element taken up by the take-up reel increases, the amount of cleaning element taken up by the rotating reel also increases, even when the rotation amount (the angle of rotation) of the take-up reel is the same. So, in a structure in which the cleaning element is taken up by rotating the take-up reel by a constant rotation amount, the amount of cleaning element used for a single cleaning operation will increase along with the increase in the outer diameter of the take-up reel. This results in a problem that the amount of cleaning element used for a single cleaning operation increases with the increase in the number of times the tool is used.

To address this problem, an objective of a third aspect of the invention is to make constant the amount of cleaning element that is used.

A primary third aspect of the invention for achieving the aforementioned objective is an optical connector cleaning tool including a tool body, and an extended part that extends from the tool body and that has a head for pressing a cleaning element against an optical connector, the extended part being provided so as to be movable with respect to the tool body, wherein: the optical connector is cleaned with the cleaning element by moving the tool body toward the extended part in a state where the cleaning element is pressed against the optical connector with the head; the tool body includes a body-side engagement part; the extended part includes a head-side engagement part; the cleaning element is stretched between the head-side engagement part and the body-side engagement part; and when the tool body is moved toward the extended part, the head-side engagement part and the body-side engagement part are separated from one another, and an amount of the cleaning element equivalent to the amount of separation of the head-side engagement part and the body-side engagement part is supplied to the head.

With this optical connector cleaning tool, the amount of cleaning element used can be made constant.

It is preferable that the optical connector cleaning tool further includes a restriction mechanism that restricts the cleaning element from being fed from the body-side engagement part to the head-side engagement part. Because the cleaning element is restricted from being fed in reverse, an amount of cleaning element equivalent to the amount of separation of the head-side engagement part and the body-side engagement part will be fed from the upstream side of the head to the downstream side thereof.

It is preferable that: the tool body has a take-up reel for taking up the cleaning element; and the restriction mechanism is a ratchet mechanism that allows the take-up reel to rotate in a take-up direction in which the cleaning element is taken up, and that restricts the take-up reel from rotating in an opposite direction from the take-up direction. In this way, it is possible to take up the cleaning element onto the take-up reel while restricting the cleaning element from being fed in reverse.

It is preferable that the optical connector cleaning tool further includes a take-up mechanism that makes the take-up reel take up the cleaning element when the head-side engagement part and the body-side engagement part near one another. Thus, an amount of cleaning element equivalent to the amount that the head-side engagement part and the body-side engagement part neared one another can be taken up with the take-up reel.

It is preferable that the take-up mechanism applies predetermined tension to the cleaning element when the head-side engagement part and the body-side engagement part near one another. In this way, even if the cleaning element on the head is not sandwiched between the head and the optical connector when the head-side engagement part and the body-side engagement part near one another, the cleaning element on the downstream side of the head can be prevented from being fed in reverse to the upstream side of the head.

It is preferable that the take-up mechanism includes: a conversion mechanism that converts relative linear motion between the tool body and the extended part into rotary motion; and a friction transmission mechanism that transmits rotary force of the rotary motion converted by the conversion mechanism to the take-up reel by friction force between a friction member and a friction surface. In this way, it is possible to apply the aforementioned predetermined tension to the cleaning element between the head-side engagement part and the body-side engagement part when the head-side engagement part and the body-side engagement part near one another.

It is preferable that the cleaning element is in the shape of a tape. The present invention is particularly effective in such cases.

Also disclosed is an optical connector cleaning method involving: (1) by using an optical connector cleaning tool including a tool body and an extended part that extends from the tool body and that has a head for pressing a cleaning element against an optical connector and that is provided so as to be movable with respect to the tool body, wherein the tool body includes a body-side engagement part, the extended part includes a head-side engagement part, and the cleaning element is stretched between the head-side engagement part and the body-side engagement part, pressing the cleaning element against the optical connector with the head; and (2) cleaning the optical connector with the cleaning element by moving the tool body toward the extended part in a state where the cleaning element is pressed against the optical connector with the head and thereby separating the head-side engagement part and the body-side engagement part from one another and supplying, to the head, an amount of cleaning element equivalent to the amount of separation of the head-side engagement part and the body-side engagement part.

With this optical connector cleaning method, the amount of cleaning element used can be made constant.

First Embodiment

Overview of Optical Connector Cleaning Tool

FIG. 1A is a perspective view of an optical connector cleaning tool (also referred to hereinafter simply as "cleaning tool") of a first embodiment. FIG. 1B is a perspective view of the tool with the cover 5 removed.

The cleaning tool 1 includes a tool body 10, and an extended part 60 that extends from the tool body 10. The tool body 10 is covered with a cover 5 (a front cover 5A and a rear cover 5B). The extended part 60 extends out from an opening in the front cover 5A and is exposed to the outside of the cover 5.

The extended part 60 has ahead 61. The head 61 is a member for pressing a cleaning element 3 against the joining end surface of an optical connector. The head 61 is located at an end part of the extended part 60, and the cleaning element 3 is exposed to the outside such that the cleaning element 3 can be pressed against an optical connector.

It should be noted that the cleaning tool 1 of the first embodiment is used for cleaning an MPO connector, for example. An MPO connector is an optical connector that uses an MT-type plastic multi-fiber optical connector (JIS C5981) as an optical connector ferrule, and is an optical connector that is coupled in an insertable/removable fashion by an optical adapter. Because the object to be cleaned is a multi-fiber optical connector, the cleaning element 3 is not formed in the shape of a thread, but rather in the shape of a tape with a certain width. However, the cleaning tool 1 may clean other types of optical connectors, and the cleaning element 3 may be in the shape of a thread in cases where the object to be cleaned is a single-fiber optical connector.

In the description below, the front/rear, left/right, and up/down directions are defined as illustrated in FIGS. 1A and 1B. That is, the "front-to-rear direction" is the direction in which the extended part 60 extends from the tool body 10 (or the direction in which the extended part 60 extends and contracts with respect to the tool body 10), wherein the side toward the extended part 60 as viewed from the tool body 10 is the "front", and the opposite side is the "rear". The "left-to-right direction" is the axial direction of the rotation axis of the take-up reel 35 (see FIG. 4; not illustrated in FIGS. 1A and 1B) inside the tool body 10, wherein the right-hand side when the tool is viewed from the front is the "right", and the opposite side is the "left". The "up-and-down direction" is the direction perpendicular to the front-to-rear direction and the left-to-right direction, wherein "up" is the side with a protrusion (key 74A) to be inserted into a key groove in an optical adapter to which the optical connector is connected, and "down" is the opposite side therefrom. Further, although not illustrated in the figure, the terms "upstream" and "downstream" following the feeding direction of the cleaning element 3 are used in some cases.

Figure 2B:
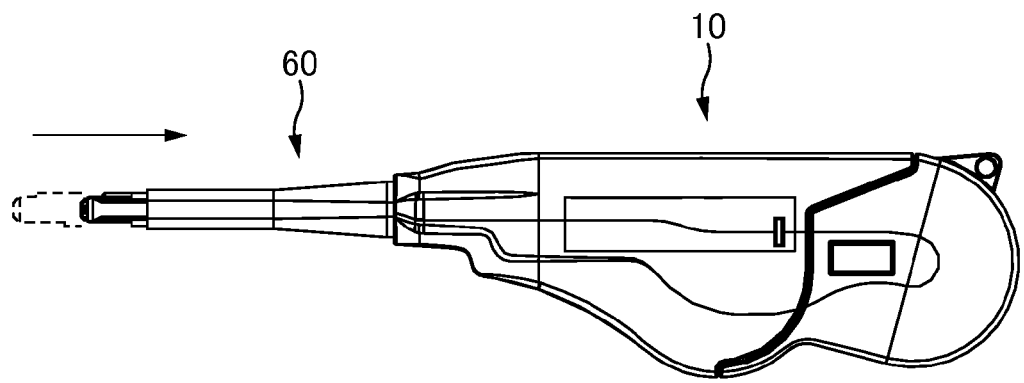
FIG. 2B is a side view of the cleaning tool 1 in its pushed state.
Figure 2C:
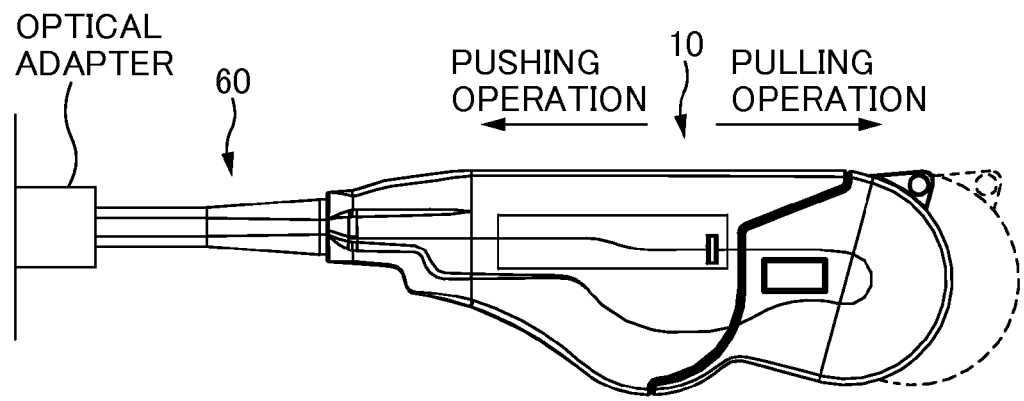
FIG. 2C is an explanatory diagram of a cleaning operation.

FIG. 2A is a side view of the cleaning tool 1 in its normal state. FIG. 2B is a side view of the cleaning tool 1 in its pushed state. FIG. 2C is an explanatory diagram of a cleaning operation.

As can be understood by comparing FIGS. 2A and 2B, the extended part 60 is provided so as to be movable in the front-to-rear direction with respect to the tool body 10. Stated differently, the extended part 60 extends and contracts in the front-to-rear direction with respect to the tool body 10. In the pushed state, the extended part 60 is retracted more into the tool body 10 than in the normal state. In FIG. 2B, the extended part 60 is illustrated as if it moves toward the rear, but in actual cleaning operations, the tool body 10 may move to the front toward the extended part 60, as illustrated in FIG. 2C. However, for the sake of brevity of explaining the structure and operations of the cleaning tool 1, there may be explanations in which the extended part 60 is moved toward the rear, as illustrated in FIG. 2B.

When an optical connector is cleaned by using the cleaning tool 1, an operator holds the tool body 10 over the cover 5, inserts the head 61 on the front side of the extended part 60 into an optical adapter, presses the cleaning element 3 on the head 61 against the optical connector inside the optical adapter, and moves the tool body 10 toward the front in this state ("pushing operation"). In this way, the tool body 10 transitions from its normal state of FIG. 2A to its pushed state of FIGS. 2B and 2C. Further, in order to remove the cleaning tool 1 by pulling out the head 61 inserted in the optical adapter, the operator moves the tool body 10 that he/she is holding toward the rear ("pulling operation"). In this way, the tool body 10 returns to its normal state of FIG. 2A from its pushed state of FIGS. 2B and 2C.

As described above, an operator performs both a pushing operation and a pulling operation in a single cleaning operation. In the pushing operation, the tool body 10 moves frontward with respect to the extended part 60 (as viewed from the tool body 10, the extended part 60 moves toward the tool body 10). In the pulling operation, the tool body 10 moves rearward with respect to the extended part 60 (as viewed from the tool body 10, the extended part 60 moves so as to separate from the tool body 10).

By the pushing operation and pulling operation performed by the operator, the tool body 10 and the extended part 60 move relatively in the front-to-rear direction. By employing the relative movement (linear motion) between the tool body 10 and the extended part 60, the cleaning tool 1 supplies unused cleaning element 3, and takes up the used cleaning element 3.

<Overall Configuration>

Figures 3A, 3B:
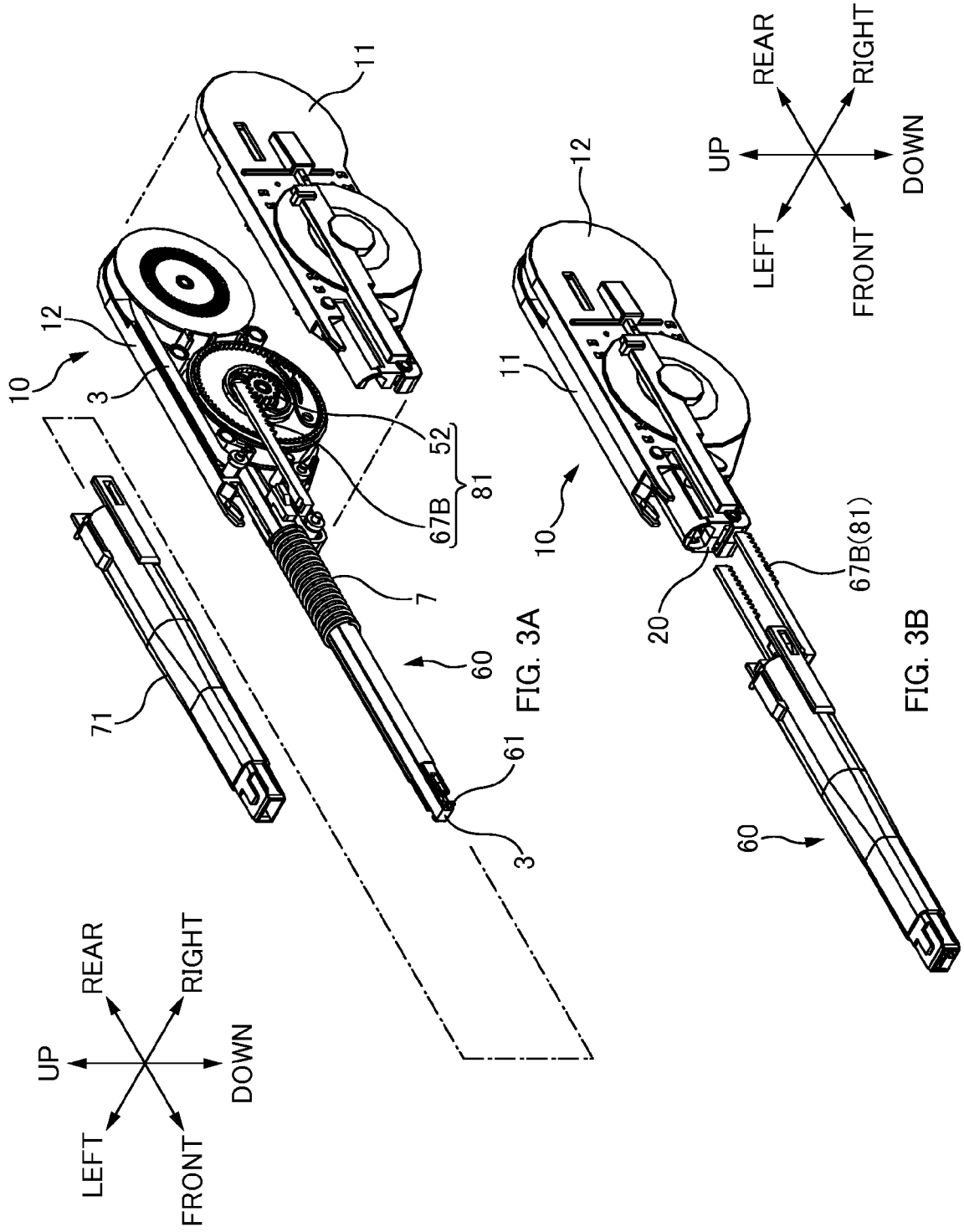
FIG. 3A is a perspective view wherein the tube body 71 of the extended part 60 and the right housing 11 of the tool body 10 have been removed.
FIG. 3B is a perspective view wherein the tool body 10 and the extended part 60 have been separated.

FIG. 3A is a perspective view wherein the tube body 71 of the extended part 60 and the right housing 11 of the tool body 10 have been removed. FIG. 3B is a perspective view wherein the tool body 10 and the extended part 60 have been separated.

The tool body 10 and the extended part 60 are coupled by a rack-and-pinion mechanism 81. The rack-and-pinion mechanism 81 is a conversion mechanism that converts the relative linear motion between the tool body 10 and the extended part 60 into rotary motion, and includes pinions 52 which are circular gears, and racks 67B which are linear gears. The pinions 52 are provided on the side of the tool body 10, and the racks 67B are provided on the side of the extended part 60.

A coil spring 7 is arranged between the tool body 10 and the extended part 60. The coil spring 7 is a spring for urging the extended part 60 toward the front with respect to the tool body 10. The coil spring 7 is arranged in a compressed state between the tool body 10 and a tube body 71. The rear end of the coil spring 7 is in contact with a spring retaining surface 20 (the front surface around the opening in the tool body 10 provided in order to allow the extended part 60 (more specifically, the trunk part 65 of the extended part 60; see FIG. 5) to extend toward the front from the tool body 10) on the front side of the tool body 10. The front end of the coil spring 7 is in contact with the inner wall of the tube body 71. In this way, the coil spring 7 creates a resilient force in a direction that separates the tool body 10 and the extended part 60 away from one another. Stated differently, the coil spring 7 constantly presses the extended part 60 (more specifically, the tube body 71) toward the front with respect to the tool body 10. By the resilient force of the coil spring 7, the tool body 10 can return to its normal state from the pushed state during a pulling operation.

Figure 4:
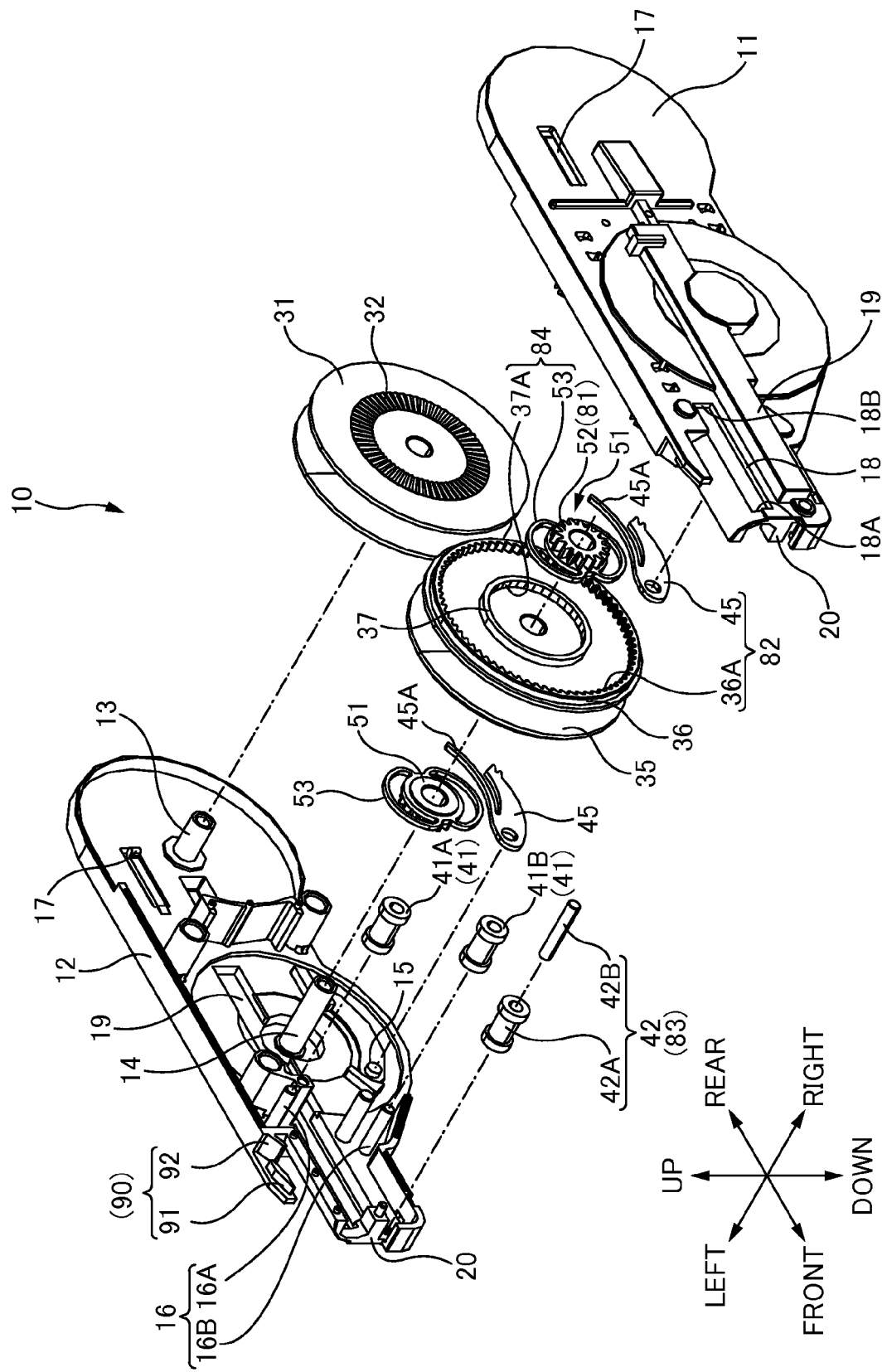
FIG. 4 is an exploded perspective view of the tool body 10.

Tool Body 10:

FIG. 4 is an exploded perspective view of the tool body 10.

The tool body 10 includes a right housing 11, a left housing 12, a supply reel 31, a take-up reel 35, and guide tubes 41.

The right housing 11 and the left housing 12 constitute a housing for covering the other constituent elements of the tool body 10 from the left and right. On the left housing 12 are formed: a supply reel support shaft 13 that rotatably supports the supply reel 31; a take-up reel support shaft 14 that rotatably supports the take-up reel 35; and a ratchet pawl shaft 15 that fits into a shaft hole of a ratchet pawl 45. Also formed on the left housing 12 are a supply-side guide shaft 16A and a take-up-side guide shaft 16B as guide shafts 16 that rotatably support the respective guide tubes 41. The right housing 11 and the left housing 12 are made of a resin, and the supply reel support shaft 13, the take-up reel support shaft 14, the ratchet pawl shaft 15, and the guide shafts 16 are formed integrally on the left housing 12.

A catch pawl 17 is formed on each of the right housing 11 and the left housing 12. The catch pawl 17 engages with engagement grooves 32 provided in a radial pattern on each of the left and right side surfaces of the supply reel 31, and thereby inhibits the supply reel 31 from idling.

Further, a movement restriction window 18 is formed in each of the right housing 11 and the left housing 12. The front edge 18A of the movement restriction window 18 constitutes a contact surface that contacts the extended part 60 (more specifically, the shoulder part 66 of the support member 63 of the extended part 60; see FIG. 5) in the normal state, and defines the positional relationship between the tool body 10 and the extended part 60 in the normal state. The rear edge 18B of the movement restriction window 18 constitutes a contact surface that contacts the extended part 60 (more specifically, the shoulder part 66 of the support member 63 of the extended part 60) in the pushed state, and defines the positional relationship between the tool body 10 and the extended part 60 in the pushed state. Stated differently, the movement restriction windows 18 define the range of movement of the extended part 60 with respect to the tool body 10.

An arm housing part 19 is formed on the inner side of each of the right housing 11 and the left housing 12. The arm housing parts 19 are sections for housing the respective arm parts 67 (see FIG. 5) of the extended part 60, on which the respective racks 67B are formed, so that the arm parts are movable in the front-to-rear direction.

Figure 5:
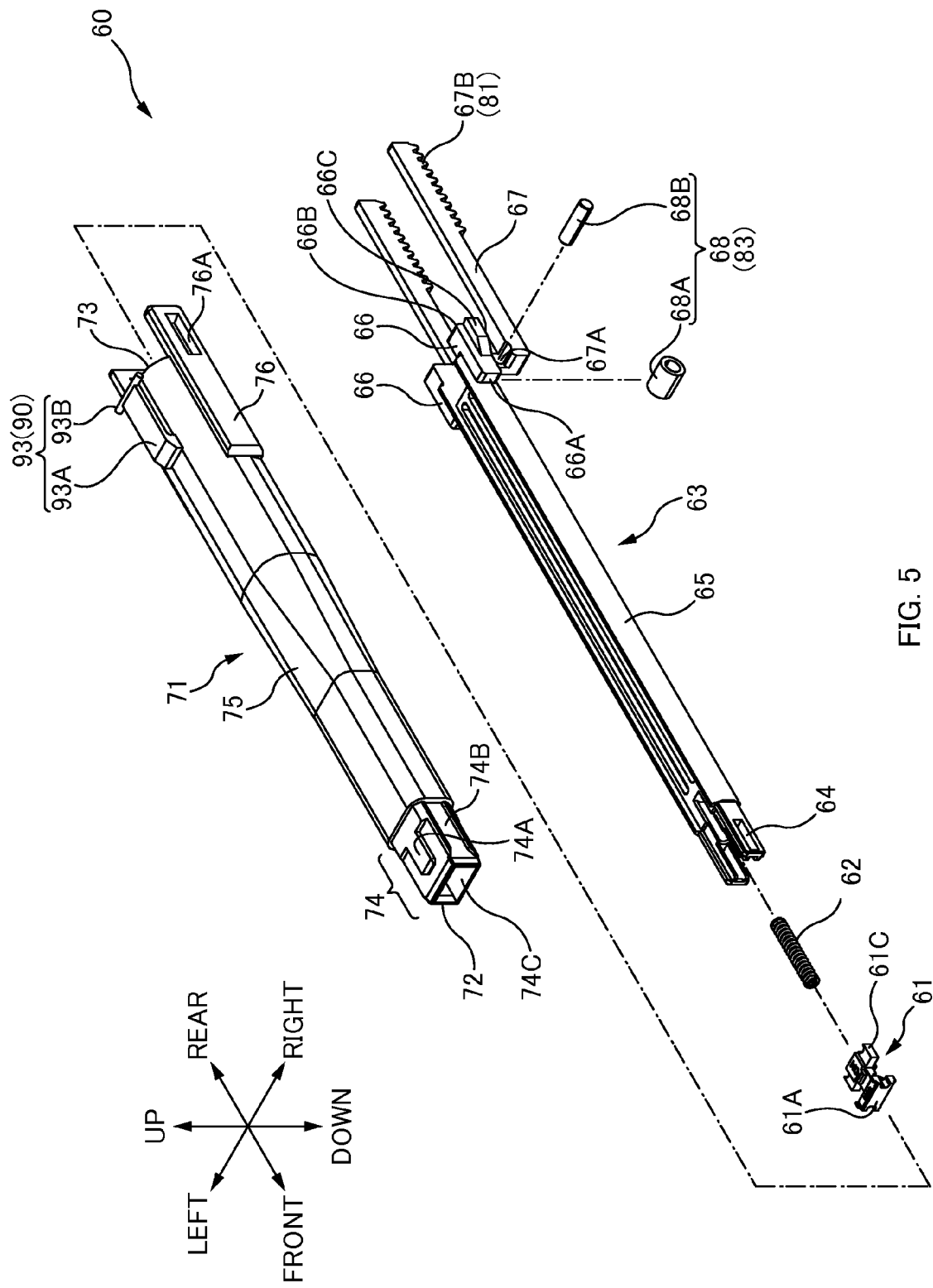
FIG. 5 is an exploded perspective view of the extended part 60.

Further, an opening for allowing the extended part 60 (more specifically, the trunk part 65 of the support member 63 of the extended part 60; see FIG. 5) to extend toward the front is formed on the front side when the right housing 11 and the left housing 12 are joined together. The front surface around this opening constitutes the spring retaining surface 20 for the rear end of the coil spring 7 (see FIG. 3) for urging the extended part 60 forward.

The supply reel 31 is a reel (circular cylindrical bobbin) for supplying the cleaning element 3. The cleaning element 3 that has not yet been used is wound around the supply reel 31. The supply reel 31 is rotatably supported by the supply reel support shaft 13 on the left housing 12. When the cleaning element 3 is supplied from the supply reel 31, the supply reel 31 rotates about the supply reel support shaft 13. Engagement grooves 32 are provided on the left and right side surfaces of the supply reel 31, and the respective catch pawls 17 on the right housing 11 and the left housing 12 inhibit the supply reel 31 from idling.

The take-up reel 35 is a reel for taking up the cleaning element 3. The cleaning element 3 that has been used is taken up by the take-up reel 35. The take-up reel 35 is rotatably supported by the take-up reel support shaft 14 on the left housing 12. As a result of the take-up reel 35 rotating about the take-up reel support shaft 14, the cleaning element 3 is taken up by the take-up reel 35.

An outer annular part 36 and an inner annular part 37 are provided on each of the left and right side surfaces of the take-up reel 35. The outer annular part 36 and the inner annular part 37 are annular sections formed so as to protrude from each side surface of the take-up reel 35 toward the outside, and are formed concentrically with the shaft hole of the take-up reel 35 so as to surround the shaft hole thereof. A ratchet gear 36A constituting a ratchet mechanism 82 is formed on the inner peripheral surface of the outer annular part 36. The inner peripheral surface of the inner annular part 37 constitutes a friction surface 37A (slip surface) for constituting a friction transmission mechanism 84. The friction transmission mechanism 84 will be described further below.

The guide tubes 41 are tubular members for guiding the cleaning element 3. The present tool body 10 includes two guide tubes 41—a supply-side guide tube 41A and a take-up-side guide tube 41B—but the tool body 10 may include other guide tubes. The supply-side guide tube 41A is rotatably supported by the supply-side guide shaft 16A. The cleaning element 3 supplied from the supply reel 31 is guided toward the head 61 of the extended part 60 by the supply-side guide tube 41A. The take-up-side guide tube 41B is rotatably supported by the take-up-side guide shaft 16B. The used cleaning element 3 is guided toward the take-up reel 35 by the take-up-side guide tube 41B.

It should be noted that, instead of using rotatable guide tubes 41, circular-cylindrical guides may be formed integrally on the left housing 12. However, the cleaning element 3 can be fed smoothly by providing rotatable guide tubes 41.

Further, the tool body 10 includes a body-side engagement part 42, a pair of ratchet pawls 45, and a pair of transmission wheels 51.

The body-side engagement part 42 is a member constituting a constant-amount feeding mechanism 83 together with a head-side engagement part 68 (described further below). The cleaning element 3 is passed over the body-side engagement part 42 and is stretched between the body-side engagement part 42 and the head-side engagement part 68 (see FIGS. 7A to 7C). The body-side engagement part 42 includes a body-side rotary tube 42A and a body-side pin 42B. The body-side rotary tube 42A is a tubular member similar to the aforementioned guide tube 41, and is rotatably supported by the body-side pin 42B. The body-side pin 42B is sandwiched and held by the right housing 11 and the left housing 12, and is fixed so as not to move in the front-to-rear direction and the up-and-down direction. It should be noted that the body-side pin 42B may be formed integrally on the left housing 12, like the aforementioned guide shafts 16. The constant-amount feeding mechanism 83 constituted by the body-side engagement part 42 will be described further below.

The ratchet pawls 45 are members constituting a ratchet mechanism 82 together with the ratchet gears 36A. The ratchet pawls 45 are provided so as to oppose the respective left and right side surfaces of the take-up reel 35, and each ratchet pawl 45 is arranged between the outer annular part 36 and the inner annular part 37 of the take-up reel 35. The ratchet pawls 45 are attached to the respective right and left housings 11 and 12 by fitting the ratchet pawl shafts 15, which are provided on the respective right and left housings 11 and 12, into the shaft hole in the respective ratchet pawls 45. The end part of a spring part 45A of the ratchet pawl 45 is urged by the right housing 11 or the left housing 12, and thereby, the ratchet pawl 45 is urged in a direction that meshes the ratchet pawl with the ratchet gear 36A.

It should be noted that the ratchet mechanism 82 is a restriction mechanism that allows the take-up reel 35 to rotate in a take-up direction in which the cleaning element 3 is taken up, and that restricts the take-up reel 35 from rotating in an opposite direction from the take-up direction. As a result of the ratchet pawls 45 meshing with the ratchet gears 36A, the rotating direction of the take-up reel 35 is restricted to one direction (the take-up direction). This prevents the take-up reel 35 from rotating in a direction that loosens the cleaning element 3 (i.e., prevents the take-up reel 35 from rotating in the opposite direction from the take-up direction).

The transmission wheel 51 is a rotary member including a pinion 52 and friction plates 53. Each transmission wheel 51 is arranged by being fitted to the friction surface 37A (inner peripheral surface) of the inner annular part 37 of the take-up reel 35. The transmission wheels 51 are rotatably supported by the take-up reel support shaft 14 on the left housing 12. Thus, the transmission wheels 51 can rotate coaxially with the take-up reel 35.

The pinions 52 of the respective transmission wheels 51 are circular gears that constitute the rack-and-pinion mechanism 81. The transmission wheels 51 rotate as a result of the pinions 52 receiving force from the racks 67B. The pinions 52 protrude more to the outside than the respective outer annular parts 36 and inner annular parts 37 of the take-up reel 35 so that they can be coupled with the racks 67B (see FIG. 5) of the extended part 60.

The friction plates 53 of each transmission wheel 51 constitute a friction transmission mechanism 84 together with the friction surface 37A of each inner annular part 37 of the take-up reel 35. The friction plate 53 is a friction member that contacts the friction surface 37A of the inner annular part 37 of the take-up reel 35 and that is for transmitting rotary force to the take-up reel 35 by friction force. The friction plate 53 also functions as a leaf spring. Friction force acts between the friction plates 53 and the friction surface 37A by the spring force of the friction plates 53.

Two friction plates 53 are provided so as to be rotationally symmetric about the shaft hole, and the transmission wheel 51 is arranged by being fitted to the friction surface 37A of the inner annular part 37 of the take-up reel 35 in a state where the central section of each friction plate 53 is elastically deformed toward the shaft hole. Thus, friction force acts upon contacting sections between the friction plates 53 and the friction surface 37A of the inner annular part 37 of the take-up reel 35. It should be noted that the transmission wheel 51 may have two or more friction plates 53. By providing two or more friction plates 53 in a rotationally symmetric manner about the shaft hole, friction force will act evenly upon each of the friction plates 53. The operation of the friction transmission mechanism 84 constituted by the transmission wheels 51 will be described further below.

Further, a cantilever guide 91 and a collision surface 92 are formed on the front side in the upper section of each of the right housing 11 and the left housing 12 of the tool body 10. The cantilever guides 91 and the collision surface constitute a collision sound generating mechanism 90 together with a cantilever 93 (described further below) of the extended part 60. The cantilever guides 91 guide the movement of the later-described cantilever 93 in the front-to-rear direction and the up-and-down direction at the time of the pushing operation and pulling operation of the cleaning tool 1. The cantilever guide 91 is a substantially parallelogrammic member provided on each of the right housing 11 and the left housing 12 and protruding from the outside toward the inside in the left-to-right direction. The collision surface 92 is a wall surface for generating a collision sound by making the cantilever 93 collide therewith when the pushing operation is completed (i.e., when the tool reaches the pushed state). The collision surface 92 is a plate-shaped member that extends obliquely downward toward the front side from an upper section of each housing. The size and the angle of arrangement of the collision surface 92 are determined in accordance with the loudness of the collision sound to be generated. The collision sound generating mechanism 90 constituted by the cantilever guides 91 and the collision surface 92 will be described further below.

Figure 6A:
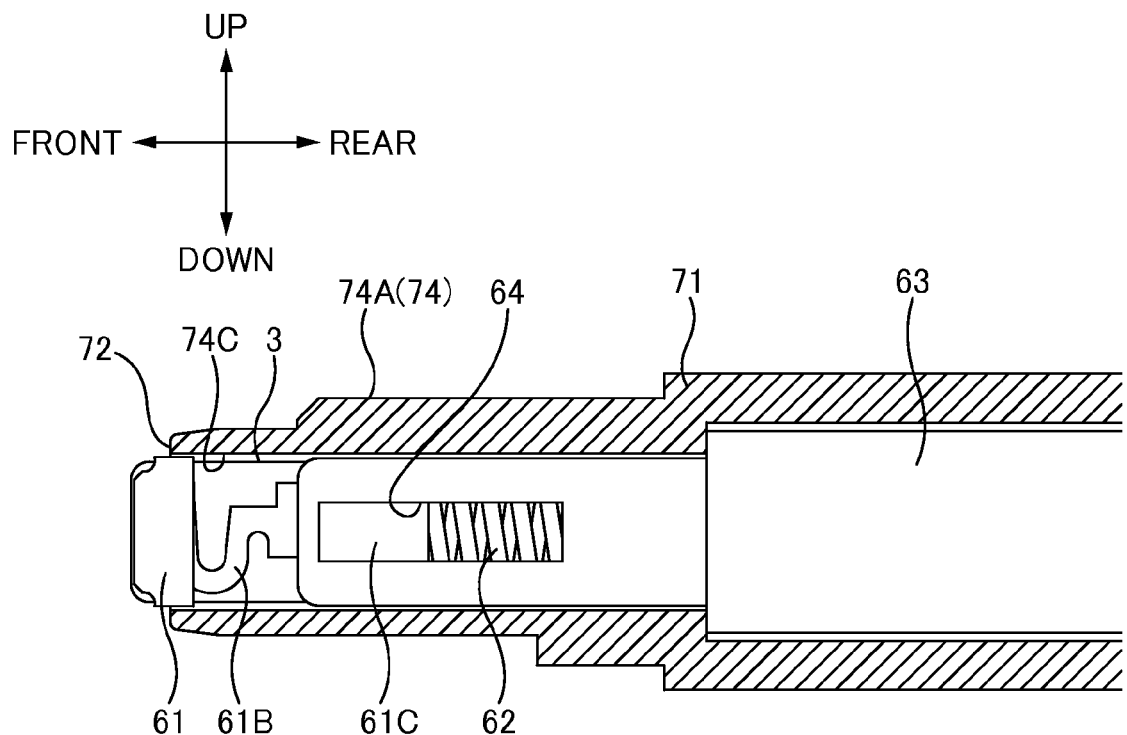
FIG. 6A is a cross-sectional view of the vicinity of the head 61 of the extended part 60.
Figure 6B:
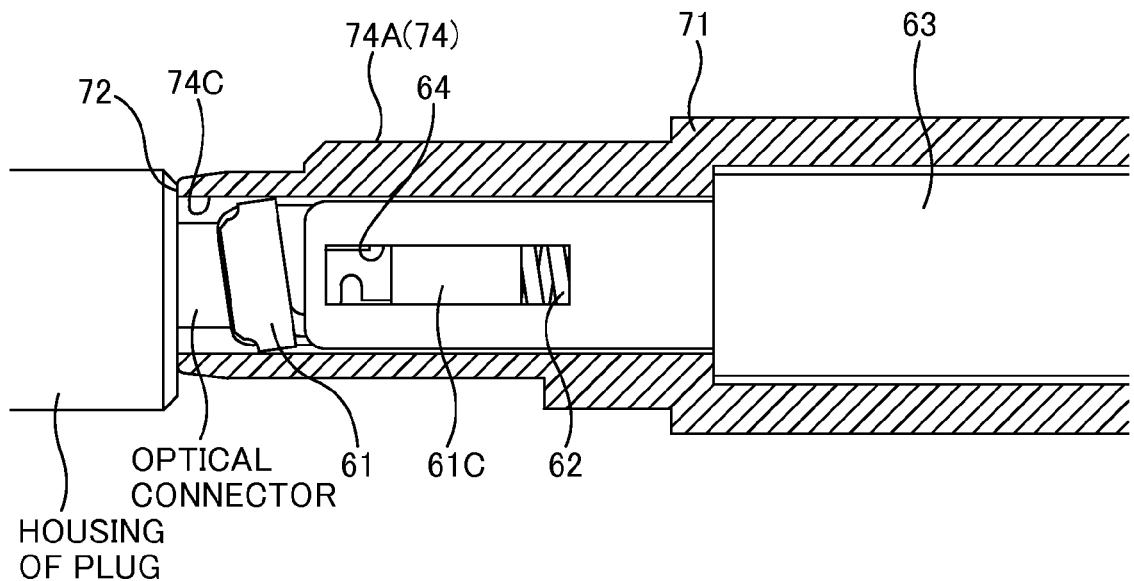
FIG. 6B is a cross-sectional view of the vicinity of the head 61 during cleaning.

Extended Part 60:

FIG. 5 is an exploded perspective view of the extended part 60. FIG. 6A is a cross-sectional view of the vicinity of the head 61 of the extended part 60. FIG. 6B is a cross-sectional view of the vicinity of the head 61 during cleaning.

The extended part 60 includes a head 61, a pressing spring 62, a support member 63, and a tube body 71.

The head 61 is a member for pressing the cleaning element 3 against the optical connector. The front end surface of the head 61 constitutes a pressing surface 61A for pressing the cleaning element 3 against the optical connector. The cleaning element 3 is wrapped around the pressing surface 61A from the upper side to the lower side thereof (see FIG. 1A). At the pressing surface 61A of the head 61, the cleaning element 3 which has not yet been used is supplied from the upper side, and the used cleaning element 3 is sent out to the lower side. A tilting spring 61B is formed on the rear side of the pressing surface 61A. By elastically deforming, the tilting spring 61B tilts the pressing surface 61A in accordance with the inclination of the joining end surface of the optical connector. A pair of protruding parts 61C is formed on the rear side of the head 61. The protruding parts 61C are sections that protrude toward the outside symmetrically in the left-to-right direction.

The pressing spring 62 is a spring that is arranged between the head 61 and the support member 63, and that urges the head 61 toward the front with respect to the support member 63. The front end of the pressing spring 62 urges the back surface of the pressing surface 61A of the head 61 toward the front. When the head 61 receives a rearward force by a pressing force from the optical connector, the pressing spring 62 deforms elastically, and the head 61 slides toward the rear with respect to the support member 63.

The support member 63 is a member that supports the head 61 so that it is movable in the front-to-rear direction. The front side of the support member 63 is provided with a pair of guide windows 64. The guide windows 64 are windows for guiding the head 61 in the front-to-rear direction. The protruding parts 61C of the head 61 are arranged in the respective guide windows 64. The front edge of each guide window 64 catches the protruding part 61C of the head 61 so that the head 61, which is urged by the pressing spring 62, does not fall out from the front side.

A trunk part 65 is formed in the central section of the support member 63. The trunk part 65 is a section that is long in the front-to-rear direction. The rear side of the trunk part 65 is arranged inside the tool body 10, and the front side of the trunk part 65 is arranged so as to extend out from the opening formed in the front side of the right housing 11 and the left housing 12.

The upper surface of the trunk part 65 serves as a guide surface for guiding, to the head 61, the cleaning element 3 supplied from the tool body 10. The lower surface of the trunk part 65 serves as a guide surface for guiding, to the head-side engagement part 68 (described further below), the cleaning element 3 that has been used at the head 61. The trunk part 65 penetrates the coil spring 7 (see FIG. 3A), and also has the function of supporting the coil spring 7.

A pair of shoulder parts 66 is formed on the rear side of the trunk part 65 of the support member 63. The shoulder parts 66 are formed so as to protrude toward the outside from the left and right of the trunk part 65, and are arranged in the respective movement restriction windows 18 (see FIG. 4) in the right housing 11 and the left housing 12. The front surface 66A of each shoulder part 66 constitutes a contact surface that contacts the front edge 18A of the movement restriction window 18 of the tool body 10 in the normal state. The rear surface 66B of each shoulder part 66 constitutes a contact surface that contacts the rear edge 18B of the movement restriction window 18 of the tool body 10 in the pushed state.

A protrusion 66C is formed toward the outside from the outer side surface of each of the shoulder parts 66, which constitute a pair. When the shoulder parts 66 are arranged in the movement restriction windows 18 of the respective right and left housings 11 and 12, the protrusions 66C on the respective shoulder parts 66 protrude toward the outside from the respective movement restriction windows 18. The protrusions 66C protruding from the respective movement restriction windows 18 are fitted into respective attachment windows 76A formed in the tube body 71, and thereby, the tube body 71 is attached to the support member 63. In order to allow the protrusions 66C to be easily fitted into the attachment windows 76A in the tube body 71, a sloping surface is formed on the front side of each protrusion 66C. It should be noted that, even though the tube body 71 constantly receives a frontward force by the coil spring 7, the tube body 71 does not fall out toward the front from the support member 63 because the protrusions 66C of the respective shoulder parts 66 of the support member 63 are in contact with the respective rear edges of the attachment windows 76A in the tube body 71, and the tube body 71 and the support member 63 are kept in a predetermined positional relationship.

The pair of shoulder parts 66 is arranged so as to oppose one another in the left-to-right direction with a gap therebetween. The gap between the shoulder parts 66 constitutes a housing part for housing a rotary tube 68A constituting the head-side engagement part 68. Further, the gap between the shoulder parts 66 also constitutes a pathway for the cleaning element 3.

An arm part 67 that extends toward the rear is formed on the lower side of each shoulder part 66. The arm parts 67 are housed in the respective arm housing parts 19 in the right and left housings 11 and 12. A pinhole 67A is formed in the front side of each arm part 67, and a rack 67B is formed on the rear side of each arm part 67. Like the shoulder parts 66, the front sides (the roots) of the pair of respective arm parts 67 oppose one another in the left-to-right direction with a gap therebetween. The gap between the front sides of the respective arm parts 67 also constitutes a housing part for housing the rotary tube 68A. The rear side of each arm part 67 is made thinner than the front side, and the distance between the rear sides is wider than that between the front sides. This is because the distance between the front sides of the respective arm parts 67 is matched with the width of the cleaning element 3, and the distance between the rear sides of the respective arm parts 67 is matched with the width of the take-up reel 35. However, the thicknesses of and distances between the front sides and rear sides of the arm parts 67 can be changed as appropriate depending on the design. For example, the distance between the rear sides may be smaller than the distance between the front sides. The take-up reel 35 of the tool body 10 is arranged between the pair of racks 67B. The pair of racks 67B are arranged more to the outside than the respective outer annular parts 36 and inner annular parts 37 of the take-up reel 35, and are coupled to the respective pinions 52 protruding toward the outside from the respective outer annular parts 36 and inner annular parts 37 of the take-up reel 35.

A head-side engagement part 68 is provided to the support member 63. Thus, the extended part 60 includes a head-side engagement part 68. The head-side engagement part 68 is a member that constitutes the constant-amount feeding mechanism 83 together with the body-side engagement part 42. The cleaning element 3 is passed over the head-side engagement part 68 and is stretched between the head-side engagement part 68 and the body-side engagement part 42 of the tool body 10 (see FIGS. 7A to 7C).

The head-side engagement part 68 is arranged more toward the rear than the body-side engagement part 42. Thus, the distance between the head-side engagement part 68 and the body-side engagement part 42 is separated from one another when the tool transitions from the normal state to the pushed state, and nears one another when the tool transitions from the pushed state to the normal state.

The head-side engagement part 68 includes a rotary tube 68A and a pin 68B. The rotary tube 68A is a tubular member similar to the aforementioned guide tube 41, and is rotatably supported by the pin 68B. The rotary tube 68A is housed in the housing part formed by the gap between the pair of shoulder parts 66 and the gap between the pair of arm parts 67. The rotary tube 68A is arranged by being sandwiched from the left and right by the pair of shoulder parts 66 and the pair of arm parts 67, and is restricted from moving toward the right and left. The pin 68B is arranged by being sandwiched between the right housing 11 and the left housing 12 so as not to fall out from the pinholes 67A in the respective arm parts 67. The constant-amount feeding mechanism 83 constituted by the head-side engagement part 68 will be described further below.

The tube body 71 is a tubular member that covers the outside of the extended part 60. The tube body 71 also has the function of covering the cleaning element 3 that is guided along the upper and lower surfaces of the support member 63.

The head 61 protrudes and is exposed from a front opening 72 in the front side of the tube body 71. When the head 61 slides to the rear by the pressing force from the optical connector, the tube body 71 receives, in the periphery of the front opening 72, a force toward the rear from the housing of the optical connector (see FIG. 6B). Due to this force, the extended part 60 moves toward the rear with respect to the tool body 10.

The shoulder parts 66 and the arm parts 67 of the support member 63 protrude toward the rear from a rear opening 73 in the rear side of the tube body 71. However, the shoulder parts 66 and the arm parts 67 protruding from the rear opening 73 are housed inside the right housing 11 and the left housing 12 of the tool body 10 and are not exposed to the outside.

The leading end part 74 on the front side of the tube body 71 is formed so as to be inserted into and positioned with respect to a connector housing hole in an optical adapter. A key 74A (protrusion) to be inserted into a key groove formed inside the optical adapter is formed on the upper surface of the leading end part 74. A recessed groove 74B extending along the front-to-rear direction is formed in each of the left and right side surfaces of the leading end part 74. The recessed grooves 74B are sections for avoiding interference with elastic engagement pieces formed on the inner walls of the optical adapter. The inner wall 74C of the leading end part 74 constitutes a guide surface that guides the head 61 so that it is movable in the front-to-rear direction.

A tapered part 75 is formed in the central section of the tube body 71. The rear side of the tapered part 75 has a greater outer diameter and inner diameter than the front side of the tapered part 75. The coil spring 7 is arranged more toward the rear than the tapered part 75 of the tube body 71.

Plate parts 76 constituting a pair are formed on the respective left and right side surfaces on the rear side of the tube body 71. The plate parts 76 of the tube body 71 are arranged more to the outside than the respective right and left housings 11 and 12 of the tool body 10. The plate parts 76 are formed so as to protrude toward the rear from the tube body 71, and an attachment window 76A is formed in the protruding section of each plate part. The protrusions 66C (the protrusions 66C of the support member 63) protruding from the respective movement restriction windows 18 in the right and left housings 11 and 12 are fitted into the respective attachment windows 76A.

Further, a cantilever 93 is formed on the rear side in the upper section of the tube body 71. The cantilever 93 constitutes the collision sound generating mechanism 90 together with the cantilever guides 91 and the collision surface 92. At the time of performing the pushing operation of the cleaning tool 1, the cantilever 93 generates a collision sound by colliding with the collision surface 92 provided to the right housing 11 and the left housing 12 of the tool body 10. The cantilever 93 includes: a beam part 93A which is a plate-shaped member supported at the front side and projecting toward the rear side; and a colliding part 93B which is a rod-shaped member provided at the end part (rear end) of the beam part 93A so as to protrude in the left-to-right direction. The operation according to which the collision sound generating mechanism 90 generates a collision sound will be described in detail further below.

<Constant-Amount Feeding Mechanism 83>

In the cleaning tool 1 of the present embodiment, the constant-amount feeding mechanism 83 is constituted by the body-side engagement part 42 of the tool body 10 and the head-side engagement part 68 of the extended part 60. The constant-amount feeding mechanism 83 is a mechanism that makes constant the amount of cleaning element 3 supplied to the head 61.

FIGS. 7A to 7C are explanatory diagrams of operations of the constant-amount feeding mechanism 83. FIG. 7A is an explanatory diagram of the normal state before the pushing operation. FIG. 7B is an explanatory diagram of the constant-amount feeding mechanism 83 in the pushed state. FIG. 7C is an explanatory diagram in the normal state after the pulling operation. In the figures, the bold line indicates the pathway of the cleaning element 3.

The cleaning element 3 supplied from the supply reel 31 is guided to the extended part 60 from the tool body 10 by the supply-side guide tube 41A. The cleaning element 3 guided to the extended part 60 is wrapped around the pressing surface 61A of the head 61 from the upper side to the lower side and is passed over the head-side engagement part 68 of the extended part 60, and is thereby stretched between the head 61 and the head-side engagement part 68 (the cleaning element is stretched in an S-shape as viewed from the right). Further, in addition to being passed over the head-side engagement part 68 of the extended part 60, the cleaning element 3 is also passed over the body-side engagement part 42 of the tool body 10, and is thereby stretched between the head-side engagement part 68 and the body-side engagement part 42 (the cleaning element is stretched in an inverted-S-shape as viewed from the right). Then, the cleaning element 3 is guided to the take-up reel 35 by the take-up-side guide tube 41B, and is taken up by the take-up reel 35.

First, we will explain the operation of the constant-amount feeding mechanism 83 for when the tool body 10 transitions from the normal state (see FIG. 7A) to the pushed state (see FIG. 7B) by a pushing operation.

In the pushing operation, the tool body 10 moves toward the front with respect to the extended part 60 in a state where the cleaning element 3 is pressed against an optical connector with the head 61. The head-side engagement part 68 of the extended part 60 is arranged more toward the rear than the body-side engagement part 42 of the tool body 10, and therefore, in the pushing operation, the head-side engagement part 68 and the body-side engagement part 42 separate from one another by the amount of movement of the tool body 10 with respect to the extended part 60.

Because the cleaning element 3 is stretched between the head-side engagement part 68 and the body-side engagement part 42, the length of the cleaning element 3 from the head 61 to the body-side engagement part 42 needs to be elongated by the amount of separation between the head-side engagement part 68 and the body-side engagement part 42 (i.e., by the amount of movement of the tool body 10 with respect to the extended part 60). Stated differently, the length of the cleaning element 3 on the downstream side of the head 61 needs to be elongated by the aforementioned amount of movement. However, the take-up reel 35 is restricted from rotating in the opposite direction from the take-up direction by the ratchet mechanism 82, and the cleaning element 3 is restricted from being fed from the body-side engagement part 42 to the head-side engagement part 68 (i.e., the cleaning element 3 is restricted from being fed in reverse), and therefore, the amount of cleaning element 3 to be elongated cannot be supplied from the take-up reel 35. Thus, an amount of cleaning element 3 equivalent to the amount of separation between the head-side engagement part 68 and the body-side engagement part 42 (i.e., equivalent to the amount of movement of the tool body 10 with respect to the extended part 60) is fed from the upstream side of the head 61 to the downstream side. That is, an amount of unused cleaning element 3 equivalent to the amount of movement of the tool body 10 with respect to the extended part 60 is supplied to the head 61, and an amount of already-used cleaning element 3 equivalent to the amount of movement of the tool body 10 with respect to the extended part 60 is sent out from the head 61.

On the other hand, the distance between the supply-side guide tube 41A and the head 61 comes closer by the amount of movement of the tool body 10 with respect to the extended part 60. As a result, the length of the cleaning element 3 from the supply-side guide tube 41A to the head 61 (or the length of the cleaning element 3 from the supply reel 31 to the head 61) is shortened by the aforementioned amount of movement. Stated differently, the length of the cleaning element 3 on the upstream side of the head 61 is shortened by the aforementioned amount of movement. Thus, an amount of cleaning element 3 equivalent to said amount is fed toward the downstream side of the head 61.

Stated differently, during the pushing operation, the head-side engagement part 68 and the body-side engagement part 42 separate from one another in a state where the cleaning element 3 is stretched between the head-side engagement part 68 and the body-side engagement part 42, and so, the tension on the cleaning element 3 on the downstream side of the head 61 increases. On the other hand, during the pushing operation, the tension on the cleaning element 3 on the upstream side of the head 61 decreases. Thus, due to this difference in tension between the upstream side and the downstream side of the head 61, the cleaning element 3 on the upstream side of the head 61 is fed toward the downstream side of the head 61.

It should be noted that, although a force in the opposite direction from the take-up direction acts upon the take-up reel 35 during the pushing operation due to the tension acting on the cleaning element 3 between the head-side engagement part 68 and the body-side engagement part 42, the take-up reel 35 does not rotate because of the action of the ratchet mechanism 82. Further, during the pushing operation, the cleaning element 3 on the upstream side of the head 61 only moves to the downstream side of the head 61, so the supply reel 31 does not rotate.

Next, we will explain the operation of the constant-amount feeding mechanism 83 for when the cleaning tool 1 transitions from the pushed state (see FIG. 7B) to the normal state (see FIG. 7C) by a pulling operation.

In the pulling operation, the tool body 10 moves toward the rear with respect to the extended part 60. The head-side engagement part 68 of the extended part 60 is arranged more toward the rear than the body-side engagement part 42 of the tool body 10, and therefore, in the pulling operation, the head-side engagement part 68 and the body-side engagement part 42 near one another by the amount of movement of the tool body 10 with respect to the extended part 60.

Because the cleaning element 3 is stretched between the head-side engagement part 68 and the body-side engagement part 42, the length of the cleaning element 3 from the head 61 to the body-side engagement part 42 becomes redundant by the amount that the head-side engagement part 68 and the body-side engagement part 42 neared one another (i.e., by the amount of movement of the tool body 10 with respect to the extended part 60). On the other hand, in the pulling operation, the take-up reel 35 rotates in the take-up direction (described further below). Thus, an amount of cleaning element 3 equivalent to the amount that the head-side engagement part 68 and the body-side engagement part 42 neared one another (i.e., equivalent to the amount of movement of the tool body 10 with respect to the extended part 60) is taken up by the take-up reel 35.

On the other hand, the distance between the supply-side guide tube 41A and the head 61 is separated by the amount of movement of the tool body 10 with respect to the extended part 60. Thus, the length of the cleaning element 3 from the supply-side guide tube 41A to the head 61 (or the length of the cleaning element 3 from the supply reel 31 to the head 61) needs to be elongated by the aforementioned amount of movement. However, before returning to the normal state, the cleaning element 3 at the head 61 is sandwiched between the head 61 and the optical connector, and the cleaning element 3 on the downstream side of the head 61 is in a state that is difficult to be fed in reverse to the upstream side of the head 61. Thus, an amount of cleaning element 3 equivalent to the amount of movement of the tool body 10 with respect to the extended part 60 is supplied from the supply reel 31. That is, an amount of cleaning element 3 equivalent to the amount of movement of the tool body 10 with respect to the extended part 60 is pulled out from the supply reel 31.

It should be noted that, during the pulling operation, a predetermined tension is applied to the cleaning element by the friction transmission mechanism 84 (and the rack-and-pinion mechanism 81) (described further below), and thus, the tension of the cleaning element 3 on the downstream side of the head 61 does not decrease and is maintained at a predetermined tension, even when the head-side engagement part 68 and the body-side engagement part 42 near one another. Thus, even if the cleaning element 3 on the head 61 is not sandwiched between the head 61 and the optical connector (i.e., even if a void cleaning operation is performed), the cleaning element 3 on the downstream side of the head 61 is not fed in reverse to the upstream side of the head 61 when the head-side engagement part 68 and the body-side engagement part 42 near one another.

As described above, the constant-amount feeding mechanism 83 is constituted by the body-side engagement part 42 provided to the tool body 10 and the head-side engagement part 68 provided to the extended part 60. The cleaning element 3 is stretched between the body-side engagement part 42 and the head-side engagement part 68, and as a result of the body-side engagement part 42 and the head-side engagement part 68 separating from one another by the relative movement (linear motion) between the tool body 10 and the extended part 60 during the pushing operation, an amount of cleaning element 3 equivalent to the amount of separation is fed from the upstream side of the head 61 to the downstream side. In this way, the amount of cleaning element 3 supplied to the head 61 is made constant, regardless of the outer diameter of the cleaning element 3 taken up by the take-up reel 35.

Further, in the aforementioned cleaning tool 1, the cleaning element 3 is restricted from being fed from the body-side engagement part 42 to the head-side engagement part 68 (i.e., the cleaning element 3 is restricted from being fed in reverse) by the ratchet mechanism 82. Thus, when the body-side engagement part 42 and the head-side engagement part 68 separate from one another, an amount of cleaning element 3 equivalent to the amount of separation between the head-side engagement part 68 and the body-side engagement part 42 (i.e., equivalent to the amount of movement of the tool body 10 with respect to the extended part 60) is fed from the upstream side of the head 61 to the downstream side.

<Friction Transmission Mechanism 84>

In the cleaning tool 1 of the present embodiment, the friction transmission mechanism 84 is constituted by the friction plates 53 on the respective transmission wheels 51 and the friction surfaces 37A of the respective inner annular parts 37 of the take-up reel 35. The friction transmission mechanism 84 is a mechanism that transmits rotary force to the take-up reel 35 by friction force. When slippage occurs between the friction plates 53 and the friction surface 37A, the friction transmission mechanism 84 can no longer transmit rotary force to the take-up reel 35. Thus, the friction transmission mechanism 84 functions as a torque limiter. Further, the friction transmission mechanism 84 constitutes, together with the rack-and-pinion mechanism 81, a take-up mechanism that makes the take-up reel 35 take up the cleaning element 3.

Figure 8A:
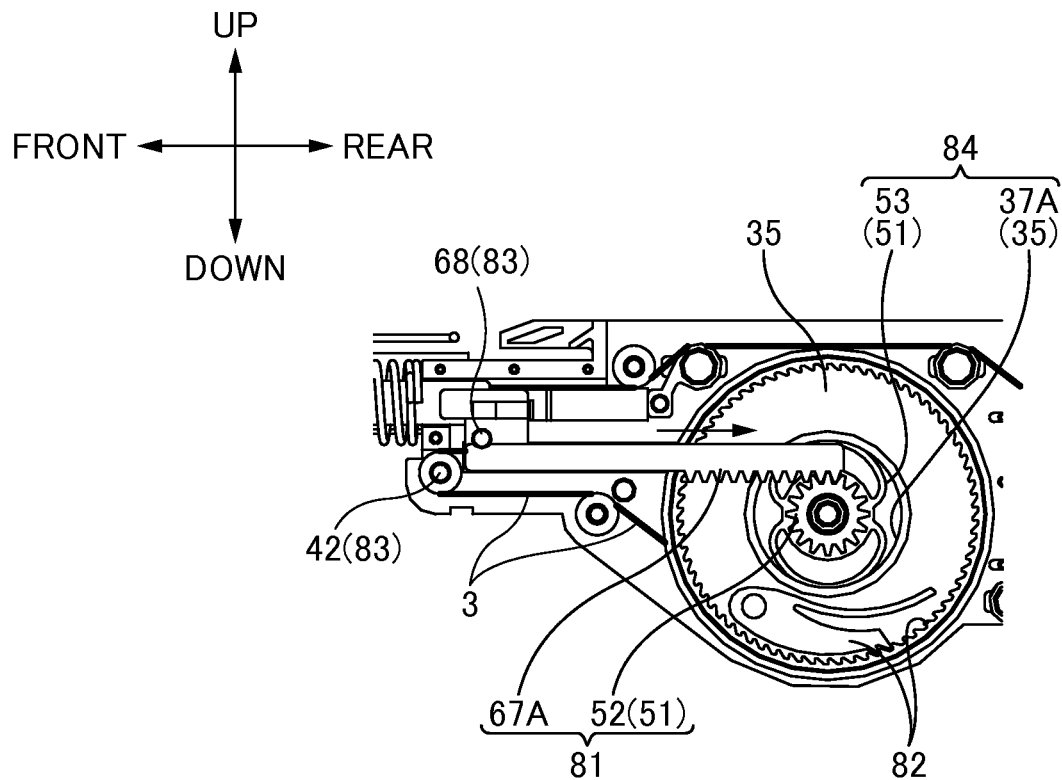
FIGS. 8A and 8B are explanatory diagrams of operations of the friction transmission mechanism 84.
Figure 8B:
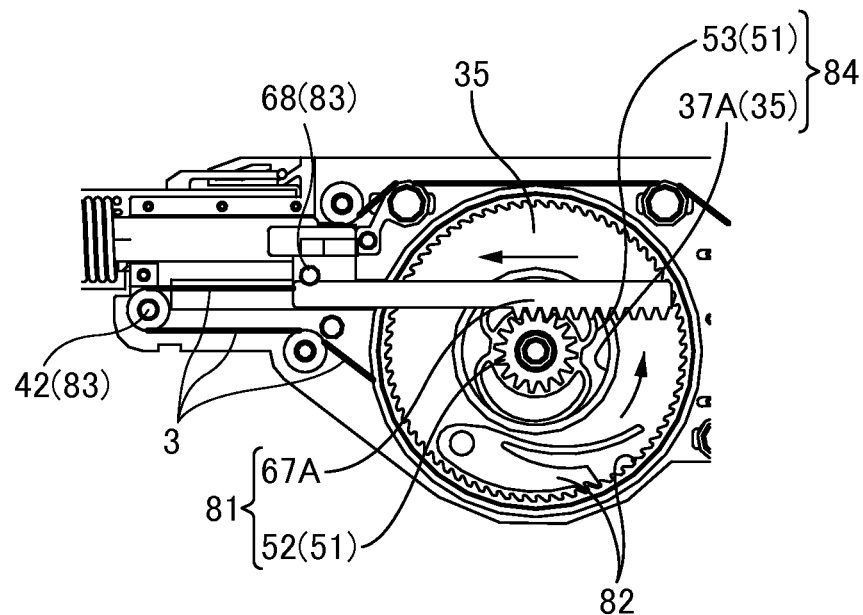

FIGS. 8A and 8B are explanatory diagrams of operations of the friction transmission mechanism 84. FIG. 8A is an explanatory diagram during the pushing operation. FIG. 8B is an explanatory diagram during the pulling operation. In these figures, the take-up direction of the take-up reel 35 is in the counter-clockwise direction. It should be noted that the ratchet mechanism 82 allows the take-up reel 35 to rotate counter-clockwise (in the take-up direction), but restricts (prohibits) the take-up reel 35 from rotating clockwise.

First, we will explain the operation of the friction transmission mechanism 84 during the pushing operation (see FIG. 8A).

In the pushing operation, the tool body 10 moves toward the front with respect to the extended part 60. The racks 67B of the extended part 60 move toward the rear with respect to the pinions 52, and thus, this linear motion is converted into clockwise rotary motion (rotary motion in a direction that makes the take-up reel 35 rotate in the opposite direction from the take-up direction) in the figure by the rack-and-pinion mechanism 81. That is, the transmission wheels 51 receive clockwise rotary force in the figure from the respective pinions 52.

The transmission wheels 51 transmit the rotary force received from the pinions 52 to the take-up reel 35 by friction force between the respective friction plates 53 and friction surfaces 37A. However, the take-up reel 35 cannot rotate clockwise owing to the ratchet mechanism 82, even when receiving clockwise rotary force via the friction surfaces 37A. Thus, slippage occurs between the friction plates 53 and the respective friction surfaces 37A, and the transmission wheels 51 idle clockwise.

It should be noted that, because the transmission wheels 51 idle clockwise, the racks 67B of the extended part 60 can move toward the rear with respect to the respective pinions 52. Thus, even when the rotation of the take-up reel 35 is restricted by the ratchet mechanism 82, the tool body 10 can move toward the front with respect to the extended part 60.

Next, we will explain the operation of the friction transmission mechanism 84 during the pulling operation (see FIG. 8B).

In the pulling operation, the tool body 10 moves toward the rear with respect to the extended part 60. The racks 67B of the extended part 60 move toward the front with respect to the pinions 52, and thus, this linear motion is converted into counter-clockwise rotary motion (rotary motion in a direction that makes the take-up reel 35 rotate in the take-up direction) in the figure by the rack-and-pinion mechanism 81. That is, the transmission wheels 51 receive counter-clockwise rotary force in the figure from the respective pinions 52.

The transmission wheels 51 transmit the counter-clockwise rotary force received from the pinions 52 to the take-up reel 35 by friction force between the respective friction plates 53 and friction surfaces 37A. Because the ratchet mechanism 82 allows the take-up reel 35 to rotate counter-clockwise, the take-up reel 35 rotates counter-clockwise (in the take-up direction) by the friction force received via the friction surfaces 37A. Thus, the cleaning element 3 is taken up by the take-up reel 35.

Tension acts upon the cleaning element 3 as a result of the take-up reel 35 taking up the cleaning element 3. The tension on the cleaning element 3 applies, to the take-up reel 35, rotary force in a direction that would make the take-up reel rotate clockwise. The rotary force that the take-up reel 35 receives due to the tension on the cleaning element 3 is in the opposite direction from the rotary force that the take-up reel 35 receives due to the friction force. When the rotary force that the take-up reel 35 receives due to the tension on the cleaning element 3 exceeds the rotary force that the take-up reel 35 receives due to the friction force (i.e., exceeds the rotary force transmissible by the friction transmission mechanism 84), slippage occurs between the friction plates 53 and the friction surfaces 37A, and the transmission wheels 51 idle counter-clockwise. The rotation amount (the angle of rotation) of the take-up reel 35 is decreased by the amount that the transmission wheels 51 idled, and therefore, the amount of cleaning element 3 taken up by the take-up reel 35 is decreased, and the tension acting on the cleaning element 3 is also suppressed.

Incidentally, as the number of times the cleaning tool 1 is used increases, the outer diameter of the cleaning element 3 taken up by the take-up reel 35 increases. As the outer diameter of the cleaning element 3 increases, the amount of cleaning element 3 taken up by the rotating reel also increases, even if the rotation amount (the angle of rotation) of the take-up reel 35 is the same. So, with a structure in which the cleaning element 3 is taken up by rotating the take-up reel 35 by a constant rotation amount, the amount of cleaning element 3 used for a single cleaning operation will increase along with the increase in the outer diameter of the take-up reel 35.

In contrast, in the present embodiment, the amount of cleaning element 3 used for a single cleaning operation is restricted to a constant amount by the constant-amount feeding mechanism 83, even when the outer diameter of the cleaning element 3 on the take-up reel 35 becomes large (see FIGS. 7A to 7C). Thus, in the present embodiment, even when the outer diameter of the cleaning element 3 on the take-up reel 35 becomes large, the amount of cleaning element 3 take up by the take-up reel 35 is restricted to a constant amount, because the amount of idle rotation of the transmission wheels 51 during the pulling operation increases and the rotation amount (the angle of rotation) of the take-up reel 35 decreases. Thus, even if the number of times the cleaning tool 1 is used increases, the amount of cleaning element 3 used for a single cleaning operation is kept constant.

Further, in the present embodiment, the friction transmission mechanism 84 applies predetermined tension (tension of a degree that causes slippage between the friction plates 53 and the friction surfaces 37A) to the cleaning element 3 during the pulling operation, and thus, the tension of the cleaning element 3 on the downstream side of the head 61 does not decrease and is maintained at a predetermined tension, even when the head-side engagement part 68 and the body-side engagement part 42 of the constant-amount feeding mechanism 83 near one another. (As a result, even if the cleaning element 3 on the head 61 is not sandwiched between the head 61 and the optical connector, the cleaning element 3 on the downstream side of the head 61 is not fed in reverse to the upstream side of the head 61 when the head-side engagement part 68 and the body-side engagement part 42 near one another, as already described above.)

<Collision Sound Generating Mechanism 90>

We will explain the operations for generating a collision sound by the collision sound generating mechanism 90. As already described above, in the present embodiment, a constant amount of cleaning element 3 is supplied to the head 61 every time the pushing and pulling operations are performed. Thus, in order to stably supply the cleaning element 3 at the time of cleaning an optical connector, it is important that both the pushing operation and the pulling operation are performed properly.

So, in this cleaning tool 1, an operator is enabled to confirm that the pushing operation was completed properly by generating a predetermined sound (collision sound) when the pushing operation is completed. The collision sound can be generated by a collision sound generating mechanism 90 including cantilever guides 91, a collision surface 92, and a cantilever 93.

Figure 9A:
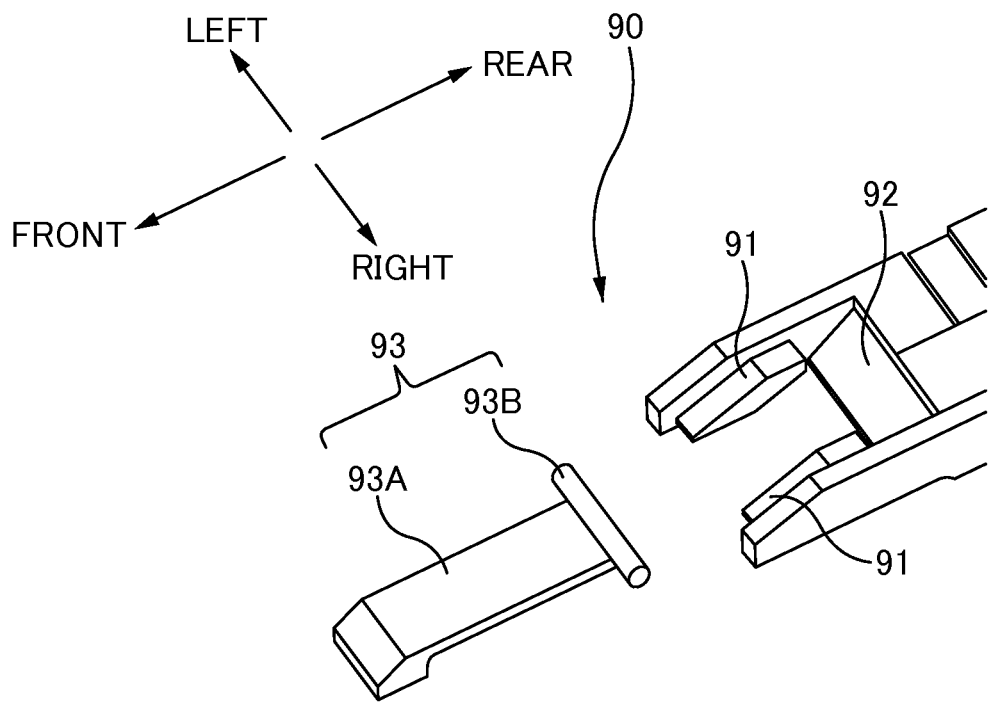
FIG. 9A is a bird's-eye view illustrating a state of the collision sound generating mechanism 90 before the pushing operation.
Figure 9B:
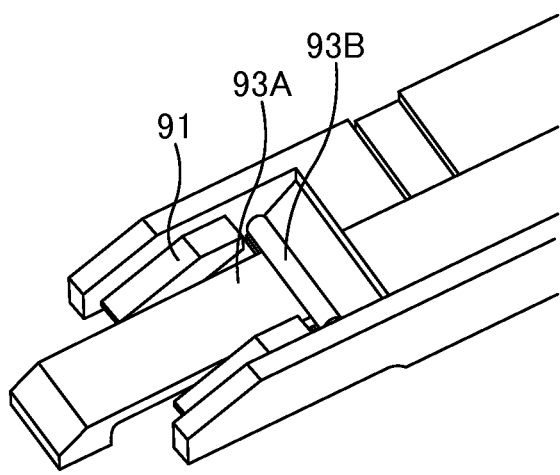
FIG. 9B is a bird's-eye view illustrating a state of the collision sound generating mechanism 90 in the pushed state.

FIG. 9A is a bird's-eye view illustrating a state of the collision sound generating mechanism 90 before the pushing operation. FIG. 9B is a bird's-eye view illustrating a state of the collision sound generating mechanism 90 in the pushed state. FIGS. 10A to 10D are side views explaining, in chronological order, operations of the collision sound generating mechanism 90 when the pushing operation and the pulling operation are performed.

Figure 10A:
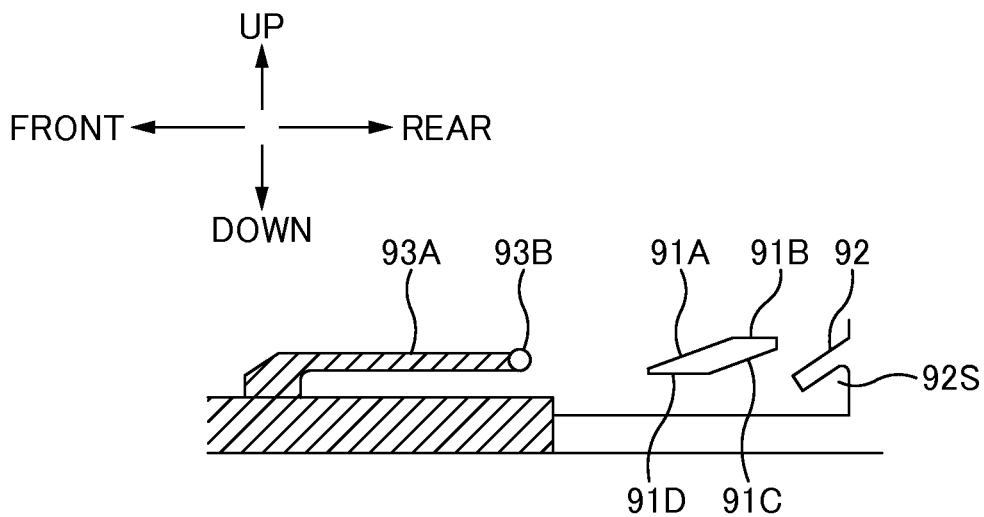
FIGS. 10A to 10D are side views explaining, in chronological order, operations of the collision sound generating mechanism 90 when the pushing operation and the pulling operation are performed.

In a state before the pushing operation, the cantilever 93 is located in front of the cantilever guides 91 (and the collision surface 92), and these are not in contact (FIGS. 9A and 10A). Starting the pushing operation from this state moves the cantilever 93, together with the extended part 60, toward the rear with respect to the tool body 10. Then, the colliding part 93B of the cantilever 93 comes into contact with the upper surface side of the cantilever guides 91. On the upper surface of each cantilever guide 91 are formed: a guide upper surface 91A sloped at a predetermined angle; and a guide upper surface 91B sloped at an angle smaller than the guide upper surface 91A (or not sloped at all). It should be noted that the position, in the up-and-down direction, of the leading end part of the guide upper surface 91A is arranged so as to be lower than the position, in the up-and-down direction, of the colliding part 93B of the cantilever 93. In this way, during the pushing operation, the colliding part 93B of the cantilever 93 contacts the upper surface side (91A in FIG. 10A) of the cantilever guide 91, and not the lower surface side (91D in FIG. 10A).

Figure 10B:
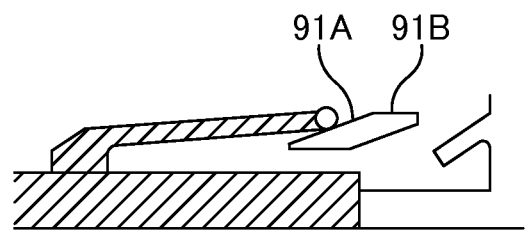

The colliding part 93B of the cantilever 93 is displaced upward while moving toward the rear along the guide upper surface 91A. At this time, because the beam part 93A of the cantilever 93 is in a cantilevered state supported at its front side, the cantilever 93 deforms so as to warp (bend) upward (FIG. 10B).

It should be noted that, as illustrated in FIGS. 9A and 9B, the colliding part 93B of the cantilever 93 protrudes in the left-to-right direction, and the protruding sections are supported by the respective cantilever guides 91. Stated differently, when the cantilever 93 moves in the front-to-rear direction, both ends of the cantilever 93 in the left-to-right direction are in a state supported by the respective cantilever guides 91. Because the cantilever 93 moves in a state wherein both ends are supported, the operation of the cantilever is stabilized. Further, because the cantilever guides 91 do not contact the beam part 93A during the movement, the cantilever guides 91 do not hinder the movement of the cantilever 93 throughout the pushing operation and the pulling operation.

Figure 10C:
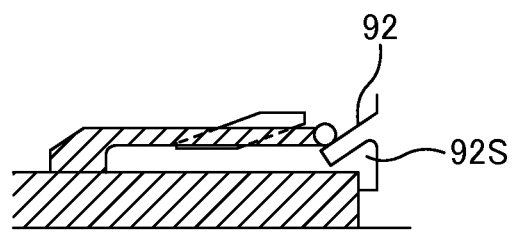
Figure 10D:
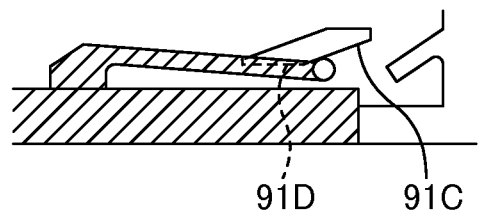

After passing the guide upper surface 91A, the colliding part 93B of the cantilever 93 moves toward the rear along the guide upper surface 91B. Then, when the colliding part reaches a predetermined position, it disengages from the rear end of the guide upper surface 91B. As described above, because the cantilever 93 is deformed so as to warp upward, when the colliding part 93B is released from the support by the guide upper surface 91B, the beam part 93A acts like a leaf spring, and the colliding part 93B is displaced downward by the elastic force of the spring and collides with the collision surface 92 (FIG. 10C). A collision sound is generated by the collision of the colliding part 93B with the collision surface 92, thus notifying the operator that the pushing operation was completed properly.

In the collision sound generating mechanism 90 of the present embodiment, a space 92S is formed between the collision surface 92 and the tool body 10. The space 92S is provided on the opposite side of the collision surface 92 from the face with which the colliding part 93B collides. By causing the collision sound, which is generated when the colliding part 93B collides with the collision surface 92, to reverberate in the space 92S, the collision sound can be generated in a loudness that can be heard by the operator. The size and shape of the space 92S are determined in accordance with the collision sound to be generated.

Further, in the present embodiment, the cross-sectional shape of the colliding part 93B is circular (see, for example, FIG. 10A). In this way, the colliding part 93B can move smoothly on the surface of the cantilever guides 91. Further, by making the cross-sectional shape into a circular shape, the colliding part 93B can collide evenly with the collision surface 92 and thereby generate a collision sound stably, even in cases where the angle of arrangement, etc., of the collision surface 92 is changed. However, a collision sound can be generated even if the cross-sectional shape of the colliding part 93B is oval or polygonal.

Further, the surface (upper surface) of each cantilever guide 91 is provided with a slope in two stages—the guide upper surface 91A and the guide upper surface 91B—and the sloping angle of the guide upper surface 91B is configured so as to be smaller than the sloping angle of the guide upper surface 91A. By making the sloping angle of the guide upper surface 91B smaller, wearing of the cantilever guides 91 and the colliding part 93B is suppressed, and breakage of the cantilever 93 is suppressed by adjusting the amount of warpage of the beam part 93A in the up-and-down direction. However, the sloping angle of the upper surface of the guide does not necessarily have to be changed. Further, the upper surface of the guide may be curved.

After the proper completion of the pushing operation, the pulling operation is started. The cantilever 93 is moved, together with the extended part 60, toward the front with respect to the tool body 10. Then, the colliding part 93B contacts the lower surface side of the cantilever guides 91. A guide lower surface 91C and a guide lower surface 91D are formed on the lower surface side of each cantilever guide 91. The guide lower surface 91C and the guide lower surface 91D are shaped so as to correspond to the guide upper surface 91A and the guide upper surface 91B, and thus, the cantilever guide 91 is substantially parallelogrammic in shape. Thus, during the pulling operation, the colliding part 93B moves toward the front along the guide lower surface 91C and the guide lower surface 91D of each cantilever guide 91, opposite from the movement during the pushing operation. The reason why the slope of the guide lower surface 91D is different from that of the guide lower surface 91C is substantially the same as the reason explained for the guide upper surface 91A and the guide upper surface 91B.

During the pulling operation, the colliding part 93B contacts the lower surface side of the cantilever guides 91, and thereby, the cantilever 93 deforms downward and the colliding part 93B is displaced toward below. That is, the colliding part 93B is displaced toward the opposite side from the direction of displacement during the pushing operation. The amount of downward displacement of the colliding part 93B during the pulling operation is set smaller compared to the amount of upward displacement of the colliding part 93B during the pushing operation, because no collision sound is generated after the pulling operation. Thus, fatiguing of the cantilever 93 can be reduced, and damage can be suppressed.

In the collision sound generating mechanism 90 of the present embodiment, a collision sound is generated by displacing the colliding part 93B of the cantilever 93 in a direction intersecting with the direction of movement of the extended part 60 with respect to the tool body 10 during the pushing operation and the pulling operation. That is, by making the cantilever 93 warp in a direction intersecting with the direction of movement, a collision sound can be generated efficiently with a small amount of warpage.

Figure 11A:
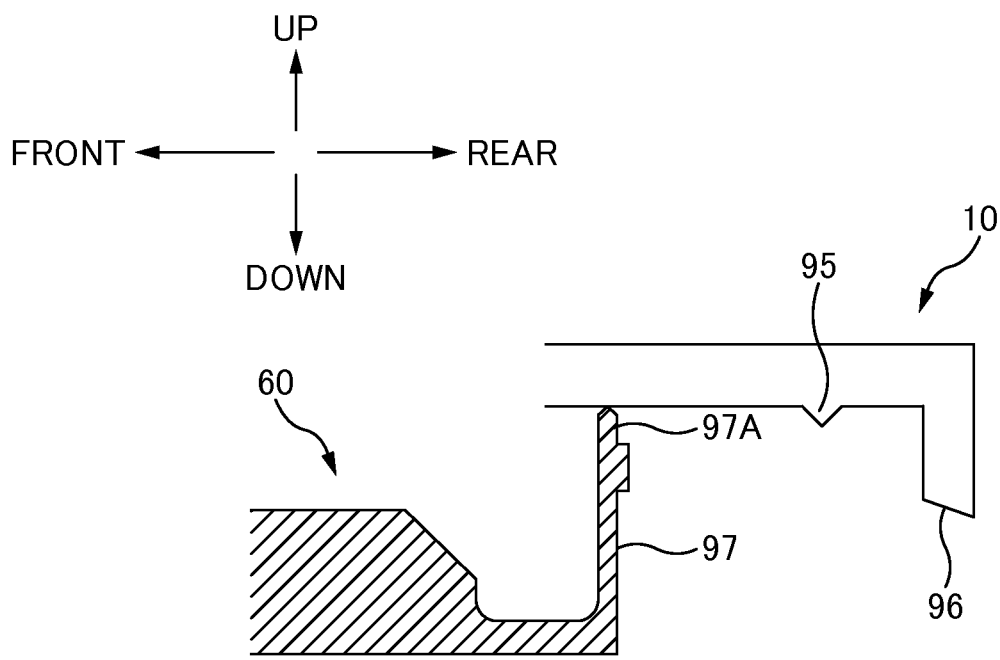
FIGS. 11A and 11B are diagrams illustrating a collision sound generating mechanism 90' of a comparative example.
Figure 11B:
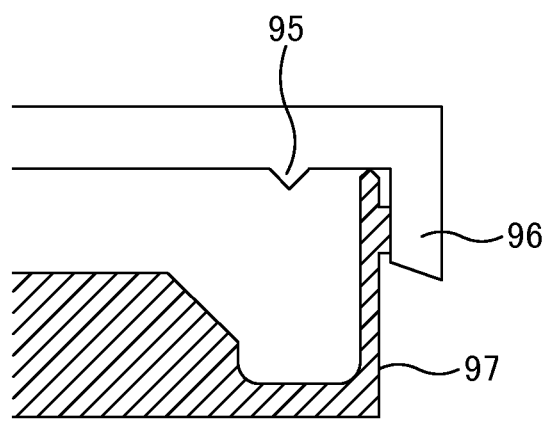

FIG. 11 illustrates a collision sound generating mechanism 90' of a comparative example. In the collision sound generating mechanism 90' of the comparative example, a protrusion 95 and a collision surface 96 are provided on the tool body 10, and a cantilever 97 is provided on the rear end part of the extended part 60. The cantilever 97 of the comparative example is formed so as to extend in the up-and-down direction, wherein one end side is joined with the extended part 60, and the other end side (97A in FIG. 11A) contacts a wall surface of the tool body 10.

When the extended part 60 moves toward the rear with respect to the tool body 10 during the pushing operation, the cantilever 97 also moves along the wall surface of the tool body 10 (see FIG. 11A). During this movement, when the end part 97A of the cantilever 97 gets caught on the protrusion 95 provided on the wall surface of the tool body 10, the cantilever 97 warps toward the front. When the extended part 60 keeps moving toward the rear, the other end part 97A disengages from the protrusion 95, and the cantilever 97 collides with the collision surface 96 due to the resilient force of the warpage, thus generating a collision sound (see FIG. 11B).

In this comparative example, the cantilever 97 warps in a direction parallel to the direction of movement of the extended part 60 with respect to the tool body 10 (i.e., parallel to the front-to-rear direction). In this case, the amount of warpage is large, and thus, stress is likely to concentrate on the joint part between the cantilever 97 and the extended part 60, and the cantilever 97 is prone to breakage. Further, due to the wearing of the protrusion 95, etc., it is difficult to generate a stable collision sound. Furthermore, in the comparative example, the amount of deformation of the cantilever during the pushing operation is about the same as the amount of deformation of the cantilever during the pulling operation, and so the structure is likely to cause fatiguing of the cantilever 97.

In contrast, in the collision sound generating mechanism 90 of the present embodiment, the direction of warpage of the cantilever 93 is in a direction intersecting with the direction of movement as described above, and thus, stress concentration, etc., is less prone to occur and the cantilever 93 is less prone to breakage, and it is easier to generate a collision sound stably.

Second Embodiment

The cleaning tool 1 of the first embodiment included a constant-amount feeding mechanism 83 (the body-side engagement part 42 and the head-side engagement part 68) that feeds the cleaning element by a constant amount, but the constant-amount feeding mechanism 83 does not have to be provided.

Figure 12A:
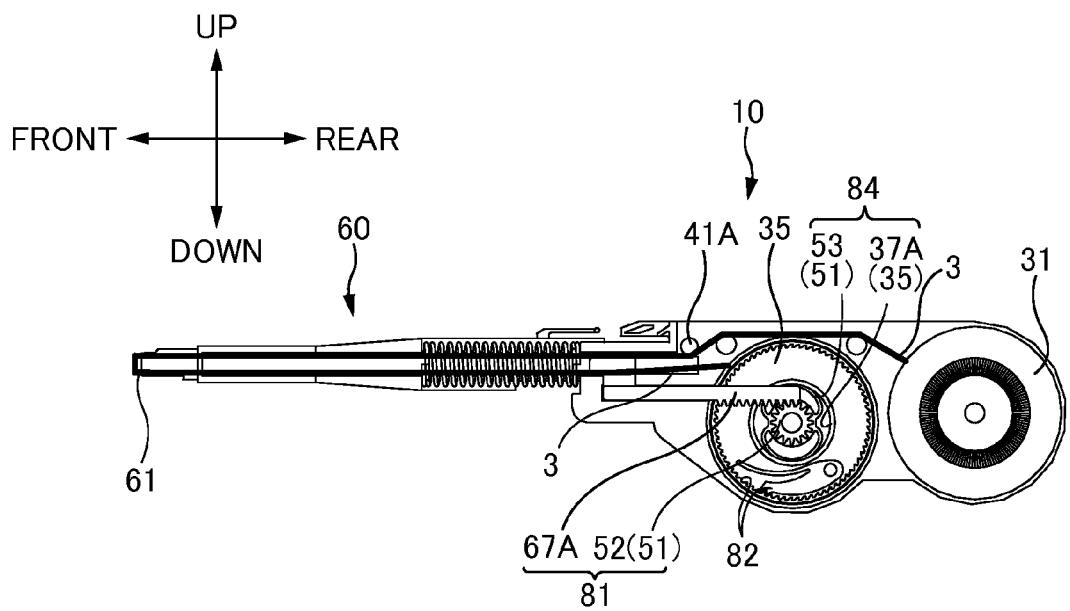
FIGS. 12A to 12C are explanatory diagrams of operations of a friction transmission mechanism 84 of a second embodiment.
Figure 12B:
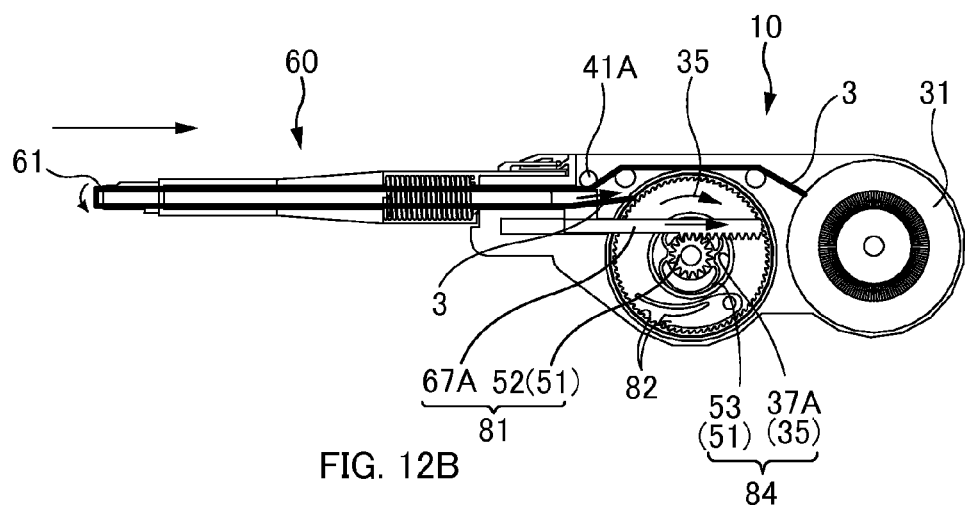
Figure 12C:
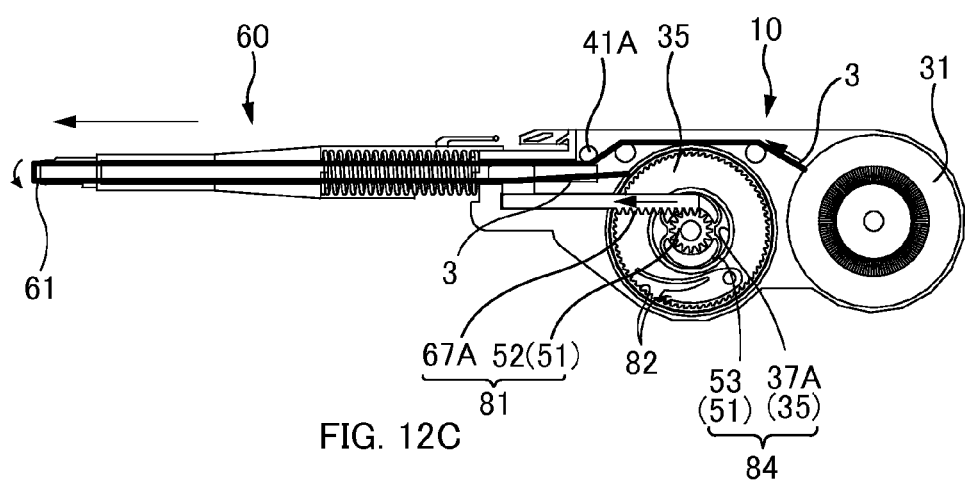

FIGS. 12A to 12C are explanatory diagrams of operations of a friction transmission mechanism 84 of a second embodiment. It should be noted that the take-up direction of the take-up reel 35 of the second embodiment is opposite from the first embodiment and is clockwise. Further, the ratchet mechanism 82 of the second embodiment is provided oppositely from the first embodiment. By the ratchet mechanism 82, the take-up reel 35 is allowed to rotate clockwise (in the take-up direction), but is restricted (prohibited) from rotating counter-clockwise.

In the pushing operation, the tool body 10 moves toward the front with respect to the extended part 60. At this time, the racks 67B of the extended part 60 move toward the rear with respect to the pinions 52, and thus, this linear motion is converted into clockwise rotary motion (rotary motion that makes the take-up reel 35 rotate in the take-up direction) in the figure by the rack-and-pinion mechanism 81. That is, the transmission wheels 51 receive clockwise rotary force in the figure from the respective pinions 52.

The transmission wheels 51 transmit the rotary force received from the pinions 52 to the take-up reel 35 by friction force between the respective friction plates 53 and friction surfaces 37A. Because the ratchet mechanism 82 allows the take-up reel 35 to rotate clockwise, the take-up reel 35 rotates clockwise (in the take-up direction) by the friction force received via the friction surfaces 37A. Thus, the cleaning element 3 is taken up by the take-up reel 35.

Tension acts upon the cleaning element 3 as a result of the take-up reel 35 taking up the cleaning element 3. When the rotary force that the take-up reel 35 receives due to the tension on the cleaning element 3 exceeds the rotary force that the take-up reel 35 receives due to the friction force (i.e., exceeds the rotary force transmissible by the friction transmission mechanism 84), slippage occurs between the friction plates 53 and the friction surfaces 37A, and the transmission wheels 51 idle clockwise. The rotation amount (the angle of rotation) of the take-up reel 35 is decreased by the amount that the transmission wheels 51 idled, and therefore, the amount of cleaning element 3 taken up by the take-up reel 35 is decreased, and the tension acting on the cleaning element 3 is also suppressed.

In the pulling operation, the tool body 10 moves toward the rear with respect to the extended part 60. At this time, the racks 67B of the extended part 60 move toward the front with respect to the pinions 52, and thus, this linear motion is converted into counter-clockwise rotary motion (rotary motion in a direction that makes the take-up reel 35 rotate in the opposite direction from the take-up direction) in the figure by the rack-and-pinion mechanism 81. That is, the transmission wheels 51 receive counter-clockwise rotary force in the figure from the respective pinions 52. Note, however, that the take-up reel 35 cannot rotate counter-clockwise owing to the ratchet mechanism 82. Thus, slippage occurs between the friction plates 53 and the respective friction surfaces 37A, and the transmission wheels 51 idle counter-clockwise.

It should be noted that, at the time of the pulling operation, the tool returns to the normal state in a state where the cleaning element 3 on the head 61 is sandwiched between the head 61 and the optical connector, and thus, an amount of cleaning element 3 equivalent to the amount of movement of the tool body 10 with respect to the extended part 60 is pulled out from the supply reel 31.

As described above, also in the second embodiment, the cleaning tool 1 includes a friction transmission mechanism 84. Thus, during the pushing operation (when the tool body moves with respect to the extended part in a manner such that the take-up reel 35 rotates in the take-up direction), when a predetermined tension acts upon the cleaning element 3, slippage occurs between the friction plates 53 and the friction surfaces 37A of the friction transmission mechanism 84, and the transmission wheels 51 idle. Thus, the rotation amount (the angle of rotation) of the take-up reel 35 is decreased by the amount that the transmission wheels 51 idled, and therefore, the amount of cleaning element 3 taken up by the take-up reel 35 can be decreased.

Third Embodiment

In the cleaning tool 1 of the third embodiment, the cantilever 93 of the collision sound generating mechanism 90 is provide on the side of the tool body 10, and the cantilever guides 91 and the collision surface 92 are provided on the side of the extended part 60. That is, the third embodiment is configured oppositely from the collision sound generating mechanism 90 of the first embodiment. The operations for generating a collision sound are substantially the same as those in the first embodiment.

FIGS. 13A to 13D are side views explaining, in chronological order, operations of the collision sound generating mechanism 90 when the pushing operation and the pulling operation are performed in the third embodiment.

Figure 13A:
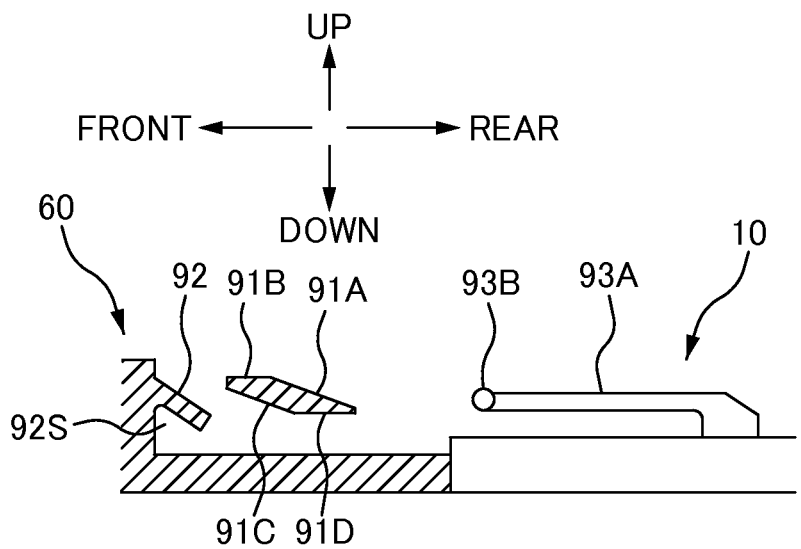
FIGS. 13A to 13D are side views explaining, in chronological order, operations of the collision sound generating mechanism 90 when the pushing operation and the pulling operation are performed in a third embodiment.
Figure 13B:
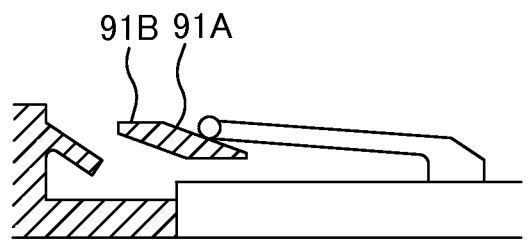
Figure 13C:
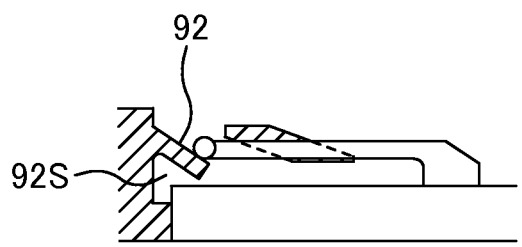

In the third embodiment, starting the pushing operation moves the cantilever guides 91 and the collision wall 92, together with the extended part 60, toward the rear with respect to the tool body 10. When the cantilever guides 91 reach the position of the colliding part 93B of the cantilever 93, the colliding part 93B comes into contact with the guide upper surface 91A of each cantilever guide 91. Then, as the guide upper surface 91A moves rearward, the colliding part 93B is displaced upward along the guide upper surface 91A (FIG. 13B).

The cantilever guides 91 keep moving, and when the colliding part 93B disengages from the front end part of the guide upper surface 91B, the colliding part 93B is displaced downward by elastic force and collides with the collision surface 92 (FIG. 13C), generating a collision sound.

Figure 13D:
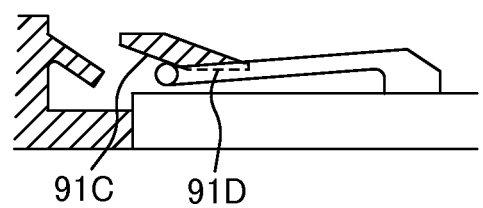

Opposite from the pushing operation, in the pulling operation, the colliding part 93B is displaced toward below along the guide lower surface 91C as the cantilever guides 91 move frontward (FIG. 13D).

Also in the third embodiment, the colliding part provided on the end part of the cantilever, which is arranged along the direction of movement, is displaced in a direction intersecting with the direction of movement, and a collision sound is generated as a result of the colliding part colliding with the collision surface due to elastic force caused by the displacement. In this way, a collision sound can be generated efficiently with a small amount of warpage, and thus, the cantilever becomes less prone to breakage and the cleaning tool can be made compact in size.

Modified Example

The aforementioned embodiments described configurations in which the colliding part provided on the end part of the cantilever is displaced in the up-and-down direction (i.e., configurations in which the cantilever warps in the up-and-down direction). The invention, however, is not limited thereto. For example, by rotating the arrangement of the cantilever 93, the cantilever guides 91, etc., by 90 degrees about an axis along the front-to-rear direction, the cantilever 93 may be configured so as to warp in the left-to-right direction in FIG. 9. That is, a collision sound is generated by displacing the colliding part in the left-to-right direction. Even in this case, the direction of displacement of the colliding part 93B (i.e., the direction of warpage of the cantilever 93) is in a direction intersecting with the direction of movement, so a collision sound can be generated stably with a small amount of displacement (amount of warpage). That is, it is possible to achieve a cleaning tool having a collision sound generating mechanism that is compact in size and that is less prone to breakage.

Reference Example

In the first embodiment, a ratchet mechanism 82 was employed as a restriction mechanism that restricts the cleaning element 3 from being fed from the body-side engagement part 42 to the head-side engagement part 68 (i.e., restricts the cleaning element 3 from being fed in reverse). However, the restriction mechanism is not limited to the ratchet mechanism 82. In the reference example described below, a pinching mechanism 86 is employed as the restriction mechanism.

Further, in this first embodiment, the rack-and-pinion mechanism 81 and the friction transmission mechanism 84 were employed as the take-up mechanism for making the take-up reel 35 take up the cleaning element 3. However, the take-up mechanism is not limited to the rack-and-pinion mechanism 81 and the friction transmission mechanism 84. In the reference example described below, a spiral-spring mechanism 87 using a spiral spring is employed as the take-up mechanism.

Figure 14A:
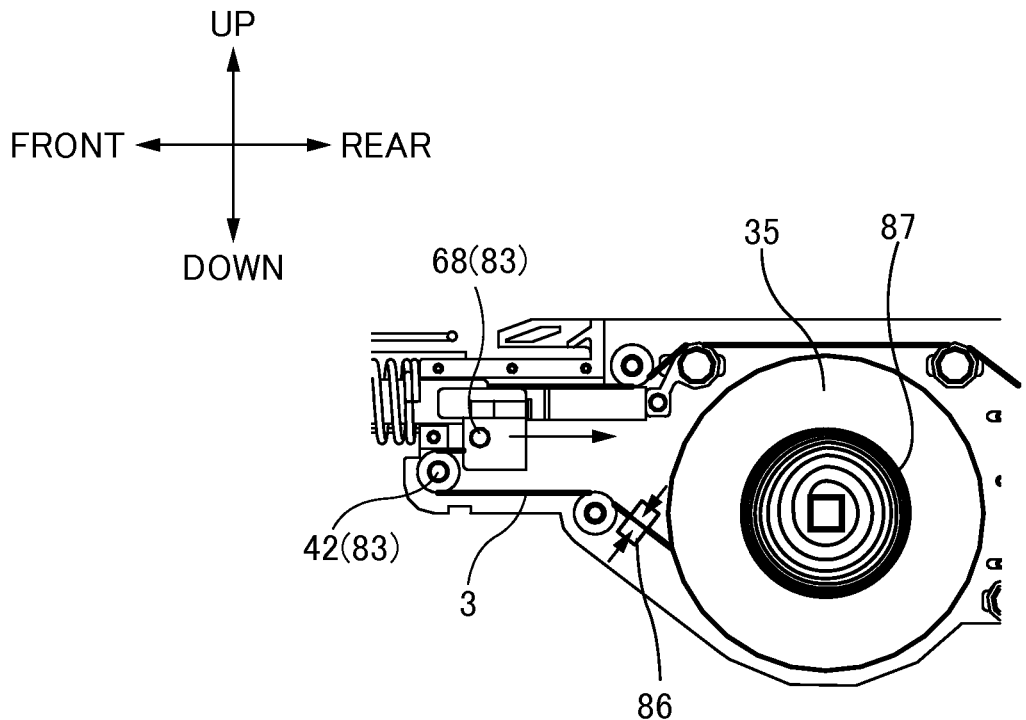
FIGS. 14A and 14B are explanatory diagrams of operations of a pinching mechanism 86 and a spiral-spring mechanism 87 of a reference example.
Figure 14B:
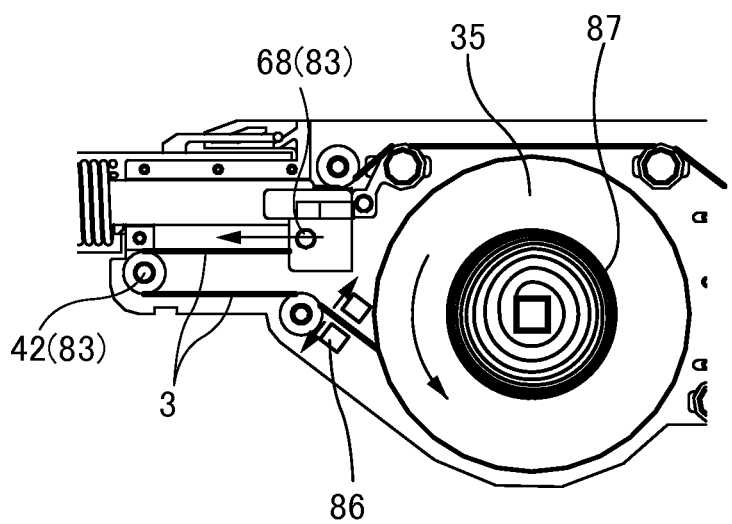

FIGS. 14A and 14B are explanatory diagrams of operations of a pinching mechanism 86 and a spiral-spring mechanism 87 of a reference example. FIG. 14A is an explanatory diagram during the pushing operation. FIG. 14B is an explanatory diagram during the pulling operation. It should be noted that the other features, including the constant-amount feeding mechanism 83, are the same as those in the first embodiment, so explanation thereof is omitted.

The pinching mechanism 86 is a mechanism that pinches the cleaning element 3 with pinching members provided on the front and the back of the cleaning element 3. The pinching mechanism 86 is configured such that the pinching members restrain the cleaning element 3 during the pushing operation (i.e., when the tool body 10 moves toward the front with respect to the extended part 60) and release the cleaning element 3 during the pulling operation (i.e., when the tool body 10 moves toward the rear with respect to the extended part 60) by means of a linking mechanism, which is not illustrated. The pinching mechanism 86 is arranged on the downstream side of the constant-amount feeding mechanism 83.

The spiral-spring mechanism 87 is a mechanism that makes the take-up reel 35 rotate in the take-up direction by a spiral spring. The outer end of the spiral spring is fixed to the take-up reel 35. The central end of the spiral spring is wound up manually, or by means of a linking mechanism employing the relative movement between the tool body 10 and the extended part 60, such that the take-up reel 35 rotates in the take-up direction.

In the pushing operation, the head-side engagement part 68 and the body-side engagement part 42 of the constant-amount feeding mechanism 83 separate from one another. At this time, the pinching mechanism 86 restrains the cleaning element 3, and the cleaning element 3 is restricted from being fed from the body-side engagement part 42 to the head-side engagement part 68 (i.e., the cleaning element 3 is restricted from being fed in reverse). Thus, an amount of cleaning element 3 equivalent to the amount of separation between the head-side engagement part 68 and the body-side engagement part 42 (i.e., equivalent to the amount of movement of the tool body 10 with respect to the extended part 60) is fed from the upstream side of the head 61 to the downstream side. That is, an amount of unused cleaning element 3 equivalent to the amount of movement of the tool body 10 with respect to the extended part 60 is supplied to the head 61, and an amount of already used cleaning element 3 equivalent to the amount of movement of the tool body 10 with respect to the extended part 60 is sent out from the head 61.

It should be noted that, during the pushing operation, tension acts upon the cleaning element 3 between the head-side engagement part 68 and the body-side engagement part 42, but because the cleaning element 3 is restrained by the pinching mechanism 86, the take-up reel 35 is prevented from rotating in the opposite direction. Further, during the pushing operation, the cleaning element 3 on the upstream side of the head 61 only moves toward the downstream side of the head 61, so also the supply reel 31 does not rotate.

In the pulling operation, the head-side engagement part 68 and the body-side engagement part 42 of the constant-amount feeding mechanism 83 near one another. At this time, the pinching mechanism 86 releases the cleaning element 3, so an amount of cleaning element 3 equivalent to the amount that the head-side engagement part 68 and the body-side engagement part 42 neared one another (i.e., equivalent to the amount of movement of the tool body 10 with respect to the extended part 60) is taken up by the take-up reel 35 by means of the spiral-spring mechanism 87.

In the aforementioned cleaning tool 1, the pinching mechanism 86 restricts the cleaning element 3 from being fed from the body-side engagement part 42 to the head-side engagement part 68 (i.e., restricts the cleaning element 3 from being fed in reverse). In this way, when the body-side engagement part 42 and the head-side engagement part 68 separate from one another, an amount of cleaning element 3 equivalent to the amount of separation between the head-side engagement part 68 and the body-side engagement part 42 (i.e., equivalent to the amount of movement of the tool body 10 with respect to the extended part 60) is fed from the upstream side of the head 61 to the downstream side.

Further, in the aforementioned cleaning tool 1, the spiral-spring mechanism 87 makes the take-up reel 35 take up the cleaning element 3 when the head-side engagement part 68 and the body-side engagement part 42 near one another. In this way, the take-up reel 35 can be made to take up an amount of cleaning element 3 equivalent to the amount that the head-side engagement part 68 and the body-side engagement part 42 neared one another (i.e., equivalent to the amount of movement of the tool body 10 with respect to the extended part 60). It should be noted that the effect of making the take-up reel 35 take up a constant amount of cleaning element 3 can be achieved, even with a configuration different from the aforementioned friction transmission mechanism 84 and the spiral-spring mechanism 87, so long as the take-up mechanism is a mechanism that makes the take-up reel 35 take up the cleaning element 3 when the head-side engagement part 68 and the body-side engagement part 42 near one another.

Further, in the aforementioned cleaning tool 1, a predetermined tension is applied to the cleaning element 3 by the spiral-spring mechanism 87. Thus, the tension of the cleaning element 3 on the downstream side of the head 61 does not decrease and is maintained at a predetermined tension, even when the head-side engagement part 68 and the body-side engagement part 42 near one another. Thus, even if the cleaning element 3 on the head 61 is not sandwiched between the head 61 and the optical connector, the cleaning element 3 on the downstream side of the head 61 is not fed in reverse to the upstream side of the head 61 when the head-side engagement part 68 and the body-side engagement part 42 near one another. It should be noted that the aforementioned effect can be achieved, even with a configuration different from the aforementioned friction transmission mechanism 84 and the spiral-spring mechanism 87, so long as there is a take-up mechanism that applies a predetermined tension to the cleaning element 3 even when the head-side engagement part 68 and the body-side engagement part 42 near one another.

Fourth Embodiment

Overall Configuration

Figure 15:
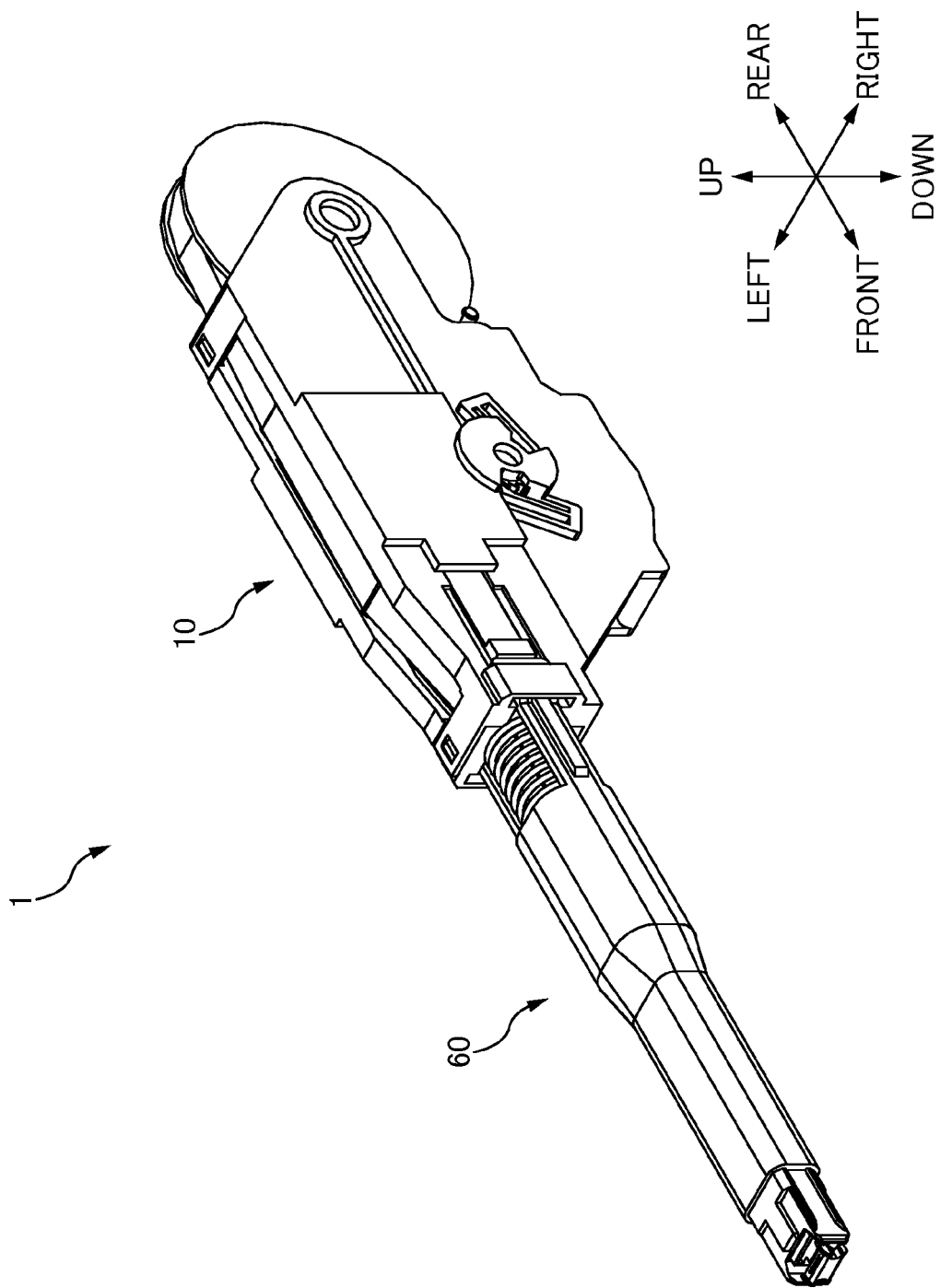
FIG. 15 is a perspective view of a cleaning tool 1 of a fourth embodiment.
Figure 17:
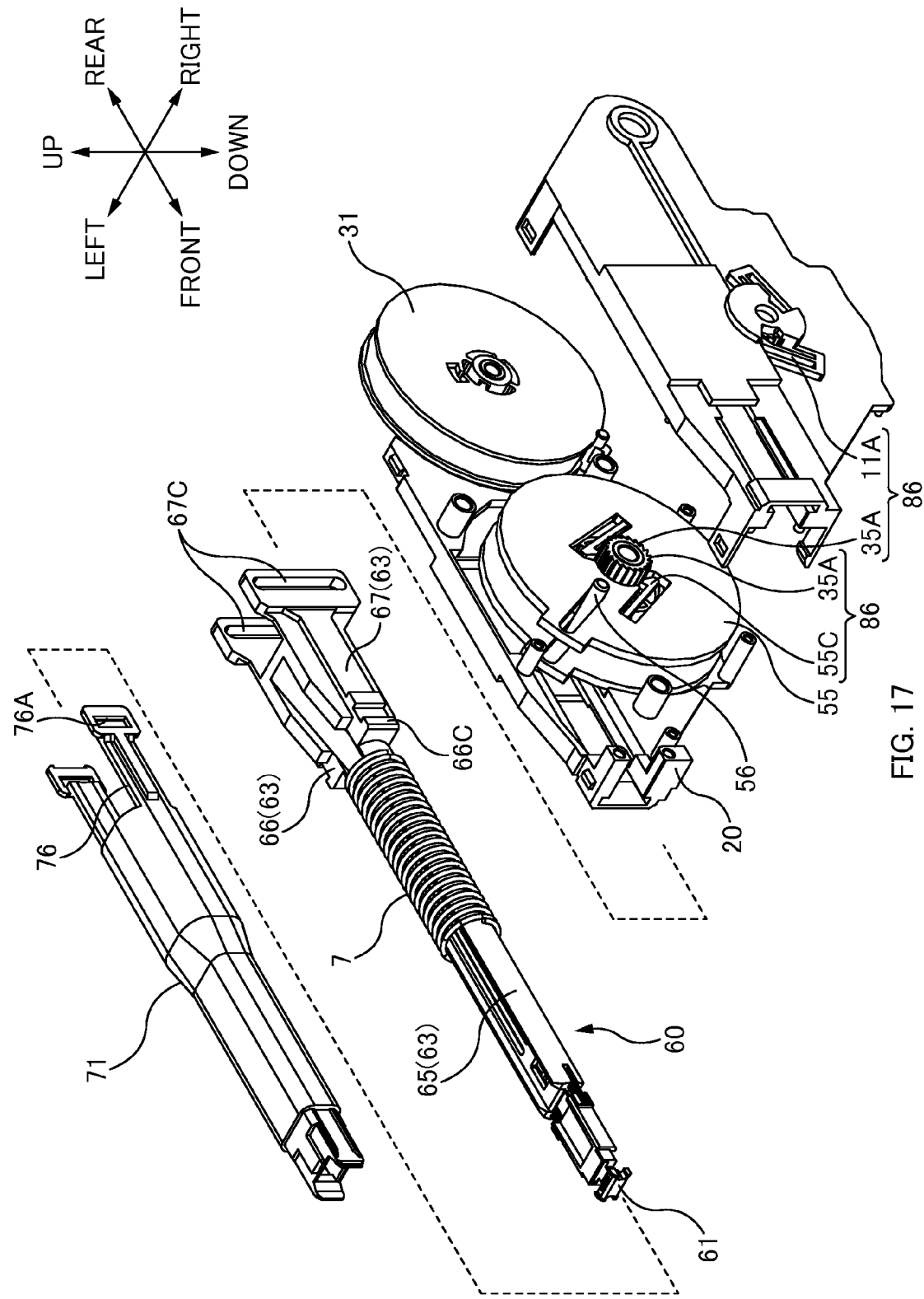
FIG. 17 is a perspective view wherein the tool body 10 and the extended part 60 have been separated.

FIG. 15 is a perspective view of a cleaning tool 1 of a fourth embodiment. FIGS. 16A and 16B are perspective views with the right housing 11 of the tool body 10 removed. FIG. 16A is a perspective view in the normal state, and FIG. 16B is a perspective view in the pushed state. FIG. 17 is a perspective view wherein the tool body 10 and the extended part 60 have been separated. In the following description, members having the same functions as those members described above are accompanied by the same reference signs, and explanation thereof may be omitted.

The tool body 10 and the extended part 60 are coupled by a conversion mechanism 85 (see FIGS. 16A and 16B). The conversion mechanism 85 is a mechanism that converts the relative linear motion between the tool body 10 and the extended part 60 into oscillating motion (rotary motion). The conversion mechanism 85 includes pinholes 67C, pinholes 55B, and an adjustment pin 56.

Figure 18:
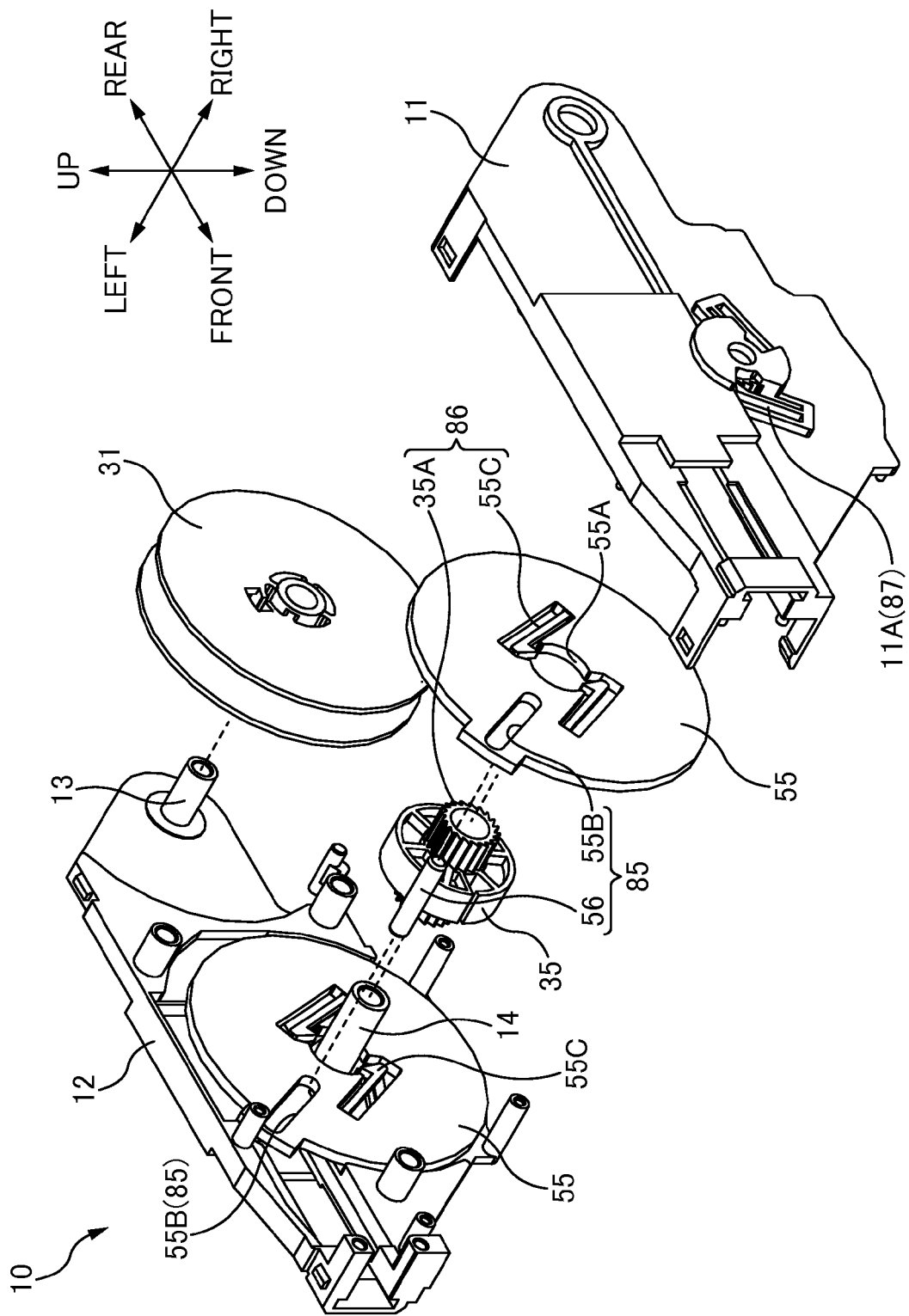
FIG. 18 is an exploded perspective view of the tool body 10.

Tool Body 10:

FIG. 18 is an exploded perspective view of the tool body 10.

The tool body 10 includes a right housing 11, a left housing 12, a supply reel 31, a take-up reel 35, and a pair of oscillation plates 55.

A ratchet gear 35A is formed on each of the left and right side surfaces of the take-up reel 35 so as to protrude therefrom. Each ratchet gear 35A is a member that constitutes a first ratchet mechanism 86 together with first ratchet pawls 55C on the respective oscillation plates 55. Further, each ratchet gear 35A is also a member that constitutes a second ratchet mechanism 87 together with a second ratchet pawl 11A on the right housing 11. It should be noted that, although not illustrated in the figure, a second ratchet pawl is formed also on the left housing 12.

The oscillation plate 55 is a disk-shaped member that performs oscillating motion (rotary motion) about its shaft hole 55A. The pair of oscillation plates 55 are arranged so as to sandwich the take-up reel 35 from the left and right, and also have the function of retaining, from the left and right, the cleaning element 3 taken up by the take-up reel 35.

Each oscillation plate 55 includes a shaft hole 55A, a pinhole 55B, and a pair of first ratchet pawls 55C. The shaft hole 55A is a shaft hole that employs, as the axis, the ratchet gear 35A that protrudes toward the left and right from the take-up reel 35. The pinhole 55B is a hole through which the adjustment pin 56 is inserted. This pinhole 55B is formed as a long hole that extends radially from the shaft hole 55A. In this way, the position of the adjustment pin 56 in the pinhole 55B varies depending on the size of the outer diameter of the cleaning element 3 on the take-up reel 35. The first ratchet pawls 55C are members that constitute the first ratchet mechanism 86 together with the ratchet gears 35A.

The first ratchet mechanism 86 is a transmission mechanism that transmits the rotary force of the oscillation plates 55 to the take-up reel 35. In the first ratchet mechanism 86, when the oscillation plates 55 rotate in one direction (the take-up direction), rotary force is transmitted to the take-up reel 35 by meshing the ratchet gears 35A and the respective first ratchet pawls 55C together, whereas when the oscillation plates 55 rotate in the other direction (the opposite direction from the take-up direction), rotary force is not transmitted to the take-up reel 35 by making the ratchet gears 35A idle with respect to the first ratchet pawls 55C. In this way, when the oscillation plates 55 rotate in one direction, the take-up reel 35 rotates in the take-up direction together with the oscillation plates 55 and the cleaning element 3 is thus taken up, whereas when the oscillation plates 55 rotate in the other direction, the take-up reel 35 does not rotate.

The second ratchet mechanism 87 is a restriction mechanism that allows the take-up reel 35 to rotate in a take-up direction in which the cleaning element 3 is taken up, and that restricts the take-up reel 35 from rotating in an opposite direction from the take-up direction. As a result of the second ratchet pawl 11A of the right housing 11 meshing with the ratchet gear 35A, the rotating direction of the take-up reel 35 is restricted to one direction (the take-up direction). Thus, when the ratchet gears 35A of the first ratchet mechanism 86 idle with respect to the first ratchet pawls 55C (i.e., when the oscillation plates 55 rotate in the opposite direction from the take-up direction), the take-up reel 35 does not rotate in the opposite direction from the take-up direction, and thus, the take-up reel 35 is prevented from rotating in a direction that loosens the cleaning element 3 (i.e., prevents the take-up reel 35 from rotating in the opposite direction from the take-up direction).

It should be noted that the second ratchet mechanism 87 does not have to be provided, so long as the take-up reel 35 does not rotate when the first ratchet mechanism 86 idles. For example, in cases where the friction force between the take-up reel support shaft 14 and the take-up reel 35 is large, the take-up reel 35 is less prone to rotate when the first ratchet mechanism 86 idles, so the second ratchet pawl 11A of the second ratchet mechanism 87 (and the second ratchet pawl (not illustrated) on the left housing 12) may be omitted.

Extended Part 60:

Arm parts 67 that extend toward the rear are formed on the pair of respective shoulder parts 66 of the support member 63 (see FIG. 17). The arm parts 67 are arranged on the outside on the left and right of the pair of oscillation plates 55 (see FIGS. 16A and 16B). A pinhole 67C is formed in each arm part 67. The pinhole 67C is a long hole along the up-and-down direction, and the adjustment pin 56 is inserted therethrough. Because the pinhole 67C is a long hole, the position of the adjustment pin 56 in the pinhole 55B is allowed to vary.

The adjustment pin 56 is inserted through the pinholes 55B provided in the tool body 10 side and the pinholes 67C provided in the extended part 60 side, and couples the tool body 10 and the extended part 60. The adjustment pin 56 has a cylindrical columnar shape, and is inserted in a rotatable state with respect to the pinholes 55B and the pinholes 67C. In this way, when the extended part 60 performs a reciprocating motion (linear motion) relatively with respect to the tool body 10, the oscillation plates 55 perform an oscillating motion (rotary motion) via the adjustment pin 56. As described further below, the position of the adjustment pin 56 inside the pinholes 55B and the pinholes 67C varies depending on the size of the outer diameter of the cleaning element 3 on the take-up reel 35.

<Explanation of Operations>

FIG. 19A is an explanatory diagram during the pushing operation in the fourth embodiment. In the figure, the take-up direction of the take-up reel 35 is clockwise.

In the pushing operation, the tool body 10 moves toward the front with respect to the extended part 60. At this time, the arm parts 67 of the extended part 60 move toward the rear with respect to the tool body 10; thus, this linear motion is converted into clockwise rotary motion in the figure by the conversion mechanism 85 (the pinholes 67C, the pinholes 55B, and the adjustment pin 56), and the oscillation plates 55 receive clockwise rotary force in the figure. Thus, the oscillation plates 55 rotate clockwise in the figure.

The oscillation plates 55 transmit the rotary force received from the conversion mechanism 85 to the take-up reel 35 via the first ratchet mechanism 86. When the oscillation plates 55 rotate clockwise in the figure, the ratchet gears 35A and the first ratchet pawls 55C of the first ratchet mechanism 86 mesh with one another, and the rotary force of the oscillation plates 55 is transmitted to the take-up reel 35. Thus, in the pushing operation, the take-up reel 35 rotates clockwise in the figure together with the oscillation plates 55, and the cleaning element 3 is taken up by the take-up reel 35.

FIG. 19B is an explanatory diagram during the pulling operation.

In the pulling operation, the tool body 10 moves toward the rear with respect to the extended part 60. At this time, the arm parts 67 of the extended part 60 move toward the front with respect to the tool body 10; thus, this linear motion is converted into counter-clockwise rotary motion in the figure by the conversion mechanism 85, and the oscillation plates 55 receive counter-clockwise rotary force in the figure. Thus, the oscillation plates 55 rotate counter-clockwise in the figure.

When the oscillation plates 55 rotate counter-clockwise in the figure, the ratchet gears 35A of the first ratchet mechanism 86 idle with respect to the first ratchet pawls 55C, and thus, the counter-clockwise rotary force of the oscillation plates 55 is not transmitted to the take-up reel 35. In addition, the take-up reel 35 is restricted from rotating counter-clockwise by the second ratchet mechanism 87 (the ratchet gears 35A and the second ratchet pawl(s) 11A; see FIG. 17). Thus, in the pulling operation, the take-up reel 35 does not rotate, and only the oscillation plates 55 rotate counter-clockwise.

FIGS. 20A and 20B are explanatory diagrams of operations when the outer diameter of the cleaning element 3 on the take-up reel 35 is large. FIG. 20A is an explanatory diagram during the pushing operation, and FIG. 20B is an explanatory diagram during the pulling operation.

When the outer diameter of the cleaning element 3 on the take-up reel 35 increases, the adjustment pin 56 is pushed up by the cleaning element 3 on the take-up reel 35, and the adjustment pin 56 inside the pinholes 55B is positioned more toward the above. That is, the adjustment pin 56 is separated from the center of rotation (shaft holes 55A) of the oscillation plates 55. The amount of relative movement between the tool body 10 and the extended part 60 during the cleaning operation is constant, and so, if the adjustment pin 56, which serves as the point where force is applied to the oscillation plates 55, is separated from the center of rotation (shaft holes 55A) of the oscillation plates 55, the rotation amount (the angle of rotation) of the oscillation plates 55 becomes small.

Figure 21A:
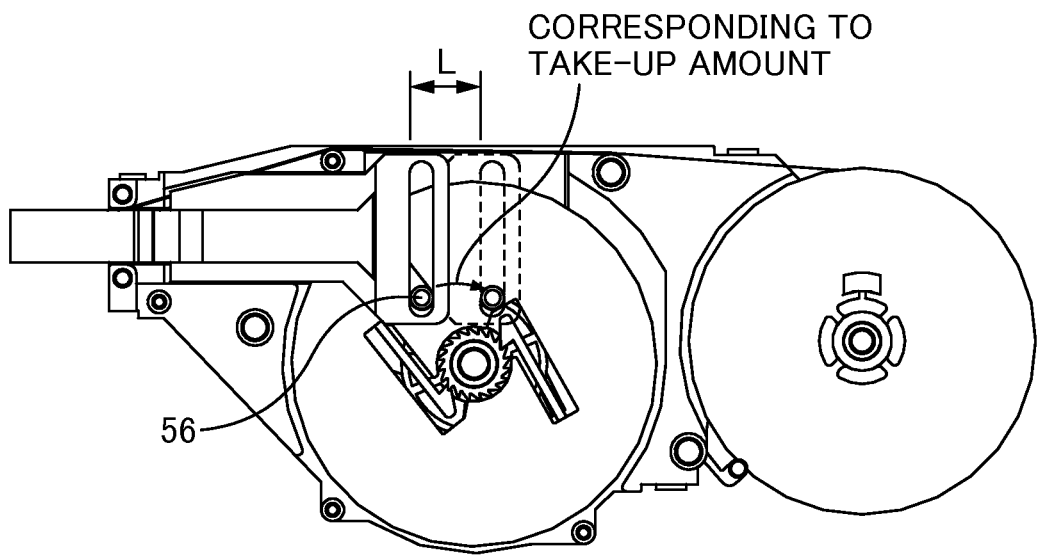
FIGS. 21A and 21B are explanatory diagrams of the take-up amount of the cleaning element 3.
Figure 21B:
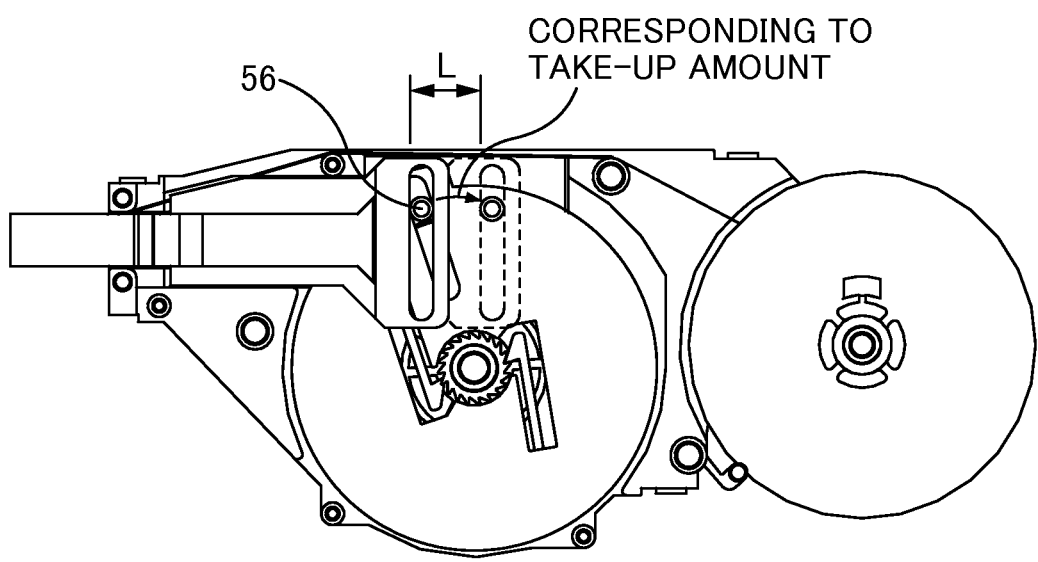

FIGS. 21A and 21B are explanatory diagrams of the take-up amount of the cleaning element 3. FIG. 21A is an explanatory diagram of the take-up amount when the outer diameter of the cleaning element 3 on the take-up reel 35 is small. FIG. 21B is an explanatory diagram of the take-up amount when the outer diameter of the cleaning element 3 on the take-up reel 35 is large.

The take-up amount of the cleaning element 3 corresponds to the amount of movement of the adjustment pin 56 when the take-up reel 35 rotates in the take-up direction (clockwise in the figure). As illustrated in in the figures, the amount of relative movement L between the tool body 10 and the extended part 60 during the cleaning operation is constant, and so, the amount of movement of the adjustment pin 56 illustrated in FIG. 21A is substantially the same as the amount of movement of the adjustment pin 56 illustrated in FIG. 21B. Thus, the take-up amount of the take-up reel 35 per single cleaning operation is hardly affected by the size of the outer diameter of the cleaning element 3 taken up by the take-up reel 35, and is substantially constant.

As described above, in the fourth embodiment, a take-up amount adjustment mechanism that makes constant the take-up amount of the take-up reel per single cleaning operation is constituted by providing long holes (pinholes 55B) that extend radially from the center of rotation (shaft holes 55A) of the respective oscillation plates 55. In this way, the amount of cleaning element that is taken up can be suppressed, even when the outer diameter of the cleaning element 3 on the take-up reel 35 becomes large, as in the first embodiment wherein the take-up amount adjustment mechanism is constituted by the friction transmission mechanism 84.

Others

The foregoing embodiments mainly describe optical connector cleaning tools 1, but needless to say, the description includes disclosures on methods for using and producing the optical connector cleaning tools 1 and methods for cleaning optical connectors.

The foregoing embodiments are for facilitating the understanding of the present invention, and are not to be construed as to limit the present invention. Needless to say, the present invention may be modified and/or improved without departing from the gist thereof, and the present invention encompasses equivalents thereof.

<Cleaning Operation>

In the foregoing embodiments, when an optical connector is cleaned by using the cleaning tool 1, an operator holds the tool body 10 over the cover 5, inserts the head 61 on the front side of the extended part 60 into an optical adapter, and cleans the optical connector inside the optical adapter. However, the optical connector cleaning operation using the cleaning tool 1 is not limited thereto. Further, the object to be cleaned does not have to be an optical connector in an optical adapter.

For example, an operator may attach a cap (not illustrated) shaped like an optical adapter to the tip end of the extended part 60 of the cleaning tool 1, insert an optical plug to be cleaned into this cap, and clean an optical connector of the optical plug inside the cap. In this case, the operator may move the object to be cleaned with respect to the cleaning tool 1 and thereby move the extended part 60 to the rear toward the tool body 10.

<Cleaning Element 3>

In the foregoing embodiments, the cleaning element was in the shape of a tape. However, the cleaning element 3 may be in the shape of a thread, or may have other cross-sectional shapes.

It should be noted that, in cases where the cleaning element 3 is tape-shaped, the outer diameter of the cleaning element 3 on the take-up reel 35 is likely to become larger compared to cases where it is thread-shaped. Thus, the effect of providing a friction transmission mechanism 84 to the cleaning tool 1 becomes particularly significant in cases where the cleaning element 3 is tape-shaped. That is, it is particularly advantageous to provide a friction transmission mechanism 84 to the cleaning tool 1 in cases where the cleaning element 3 is tape-shaped.

Furthermore, in cases where the cleaning element 3 is tape-shaped, the outer diameter of the cleaning element 3 on the take-up reel 35 is likely to become larger compared to cases where it is thread-shaped. Thus, the effect of providing a constant-amount feeding mechanism 83 to the cleaning tool 1 becomes particularly significant in cases where the cleaning element 3 is tape-shaped. That is, it is particularly advantageous to provide a constant-amount feeding mechanism 83 to the cleaning tool 1 in cases where the cleaning element 3 is tape-shaped.

<Ratchet Mechanism 82>

In the ratchet mechanism 82 of the first embodiment, the ratchet gears 36A were provided on the side of the take-up reel 35, and the ratchet pawls 45 were provided on the side of the housings. However, the ratchet mechanism 82 may be constructed by arranging the ratchet pawls 45 on the side of the take-up reel 35 and arranging the ratchet gears 36A on the side of the housings.

Further, the cleaning tool 1 does not have to include the ratchet mechanism 82. It will suffice if the cleaning tool 1 includes a restriction mechanism (such as a unidirectional clutch) that allows the take-up reel 35 to rotate in a take-up direction in which the cleaning element 3 is taken up, and that restricts the take-up reel 35 from rotating in an opposite direction from the take-up direction. With such a cleaning tool, when the tool body 10 moves with respect to the extended part 60 such that the take-up reel 35 rotates in the opposite direction from the take-up direction, the take-up reel 35 is restricted from rotating in the opposite direction by the restriction mechanism, and slippage occurs between the friction plates 53 and the friction surfaces 37A of the friction transmission mechanism 84. In this way, the tool body 10 is allowed to move with respect to the extended part 60 such that the take-up reel 35 rotates in the opposite direction from the take-up direction.

Further, as described in the reference example, even if the cleaning tool 1 does not include the ratchet mechanism 82, an amount of cleaning element 3 equivalent to the amount of separation between the head-side engagement part 68 and the body-side engagement part 42 (i.e., equivalent to the amount of movement of the tool body 10 with respect to the extended part 60) can be fed from the upstream side of the head 61 to the downstream side when the body-side engagement part 42 and the head-side engagement part 68 are separated from one another, so long as the cleaning tool 1 includes a restriction mechanism that can restrict the cleaning element 3 from being fed from the body-side engagement part 42 to the head-side engagement part 68 (i.e., restrict the cleaning element 3 from being fed in reverse).

<Friction Transmission Mechanism 84>

In the friction transmission mechanism 84 of the first embodiment, the friction surfaces were provided on the side of the take-up reel 35, and the friction plates 53 were provided on the side of the transmission wheels 51. However, the friction transmission mechanism 84 may be constructed by arranging the friction plates 53 on the side of the take-up reel 35 and arranging the friction surfaces on the side of the transmission wheels 51.

Further, the friction plate 53 of the friction transmission mechanism 84 in the first embodiment has the function as a friction member that contacts the friction surface and the function as a leaf spring. However, the friction member contacting the friction surface and the spring for pressing the friction member against the friction surface may be made of separate members.

REFERENCE SIGNS LIST

1: Cleaning tool; 3: Cleaning element;
5: Cover; 5A: Front cover; 5B: Rear cover; 7: Coil spring;
10: Tool body; 11: Right housing; 11A: Second ratchet pawl;
12: Left housing;
13: Supply reel support shaft; 14: Take-up reel support shaft;
15: Ratchet pawl shaft;
16: Guide shaft; 16A: Supply-side guide shaft; 16B: Take-up-side guide shaft;
17: Catch pawl; 18: Movement restriction window; 18A: Front edge; 18B: Rear edge;
19: Arm housing part; 20: Spring retaining surface;
31: Supply reel; 32: Engagement grooves;
35: Take-up reel; 35A: Ratchet gear;
36: Outer annular part; 36A: Ratchet gear;
37: Inner annular part; 37A: Friction surface;
41: Guide tube; 41A: Supply-side guide tube; 41B: Take-up-side guide tube;
42: Body-side engagement part; 42A: Body-side rotary tube; 42B: Body-side pin;
45: Ratchet pawl; 45A: Spring part;
51: Transmission wheel; 52: Pinion; 53: Friction plate;
55: Oscillation plate; 55A: Shaft hole; 55B: Pin hole; 55C: First ratchet pawl;
56: Adjustment pin;
60: Extended part; 61: Head;
61A: Pressing surface; 61B: Tilting spring; 61C: Protruding part;
62: Pressing spring; 63: Support member; 64: Guide window;
65: Trunk part;
66: Shoulder part; 66A: Front surface; 66B: Rear surface; 66C: Protrusion;
67: Arm part; 67A: Pin hole; 67B: Rack; 67C: Pin hole;
68: Head-side engagement part; 68A: Rotary tube; 68B: Pin;
71: Tube body; 72: Front opening; 73: Rear opening;
74: Leading end part; 74A: Key; 74B: Recessed groove; 74C: Inner wall;
75: Tapered part; 76: Plate part; 76A: Attachment window;
81: Rack-and-pinion mechanism; 82: Ratchet mechanism;
83: Constant-amount feeding mechanism; 84: Friction transmission mechanism;
85: Conversion mechanism; 86: First ratchet mechanism; 87: Second ratchet mechanism;
90: Collision sound generating mechanism; 91: Cantilever guide;
91A, 91B: Guide upper surfaces; 91C, 91D: Guide lower surfaces;
92: Collision surface; 93: Cantilever; 93A: Beam part; 93B: Colliding part.

The invention claimed is:

1. An optical connector cleaning tool comprising:
a tool body;
an extended part that extends from said tool body and that comprises a head for pressing a cleaning element against an optical connector, wherein said extended part is movable with respect to said tool body; and
a conversion mechanism that converts relative linear motion between said tool body and said extended part into rotary motion, wherein:
said tool body includes:
a take-up reel that, in accordance with the movement of said tool body with respect to said extended part, takes up said cleaning element which has been sent out from said head, and
a take-up amount adjustment mechanism comprising a friction transmission mechanism that transmits rotary force of the rotary motion converted by said conversion mechanism to said take-up reel by friction between a friction member and a friction surface, wherein the take-up amount adjustment mechanism maintains constant the take-up amount of said take-up reel per single cleaning operation, and
the cleaning element cleans the optical connector by moving said tool body toward said extended part in a state where said cleaning element is pressed against said optical connector with said head.

2. The optical connector cleaning tool according to claim 1, wherein slippage occurs between said friction member and said friction surface of said friction transmission mechanism in a case where predetermined tension acts upon said cleaning element when said tool body moves with respect to said extended part in a manner such that said rotary motion is in a direction that makes said take-up reel rotate in a take-up direction.

3. The optical connector cleaning tool according to claim 2, wherein:
said optical connector cleaning tool includes a constant-amount feeding mechanism that makes constant the amount of said cleaning element fed to said head by a single cleaning operation; and
the take-up amount of said take-up reel is made constant due to the occurrence of slippage between said friction member and said friction surface of said friction transmission mechanism when said tool body moves with respect to said extended part in a manner such that said rotary motion is in a direction that makes said take-up reel rotate in a take-up direction.

4. The optical connector cleaning tool according to claim 2, wherein:
said tool body includes a body-side engagement part;
said extended part includes a head-side engagement part;

said cleaning element is stretched between said head-side engagement part and said body-side engagement part;

when said tool body is moved toward said extended part, an amount of said cleaning element equivalent to the amount of movement is supplied to said head as a result of said head-side engagement part and said body-side engagement part being separated from one another; and when said head-side engagement part and said body-side engagement part near one another, slippage occurs between said friction member and said friction surface of said friction transmission mechanism and an amount of said cleaning element equivalent to said amount of movement is taken up by said take-up reel.

5. The optical connector cleaning tool according to claim 1, wherein:

said optical connector cleaning tool includes a restriction mechanism that allows said take-up reel to rotate in a take-up direction in which said cleaning element is taken up, and that restricts said take-up reel from rotating in an opposite direction from said take-up direction; and said restriction mechanism restricts said take-up reel from rotating in said opposite direction when said tool body moves with respect to said extended part in a manner such that said rotary motion is in a direction that makes said take-up reel rotate in said opposite direction.

6. The optical connector cleaning tool according to claim 1, wherein:

said conversion mechanism is a rack-and-pinion mechanism;

said extended part includes a rack that constitutes said rack-and-pinion mechanism; and said friction member constituting said friction transmission mechanism is provided to a pinion that constitutes said rack-and-pinion mechanism.

7. The optical connector cleaning tool according to claim 6, wherein:

the rotation axis of said pinion is coaxial with the rotation axis of said take-up reel; and at least two of said friction members are provided so as to be rotationally symmetric about the rotation axis of said pinion.

8. The optical connector cleaning tool according to claim 1, wherein:

a cantilever arranged along the direction of relative movement between said tool body and said extended part is provided to either one of said tool body and said extended part;

a guide that displaces an end part of said cantilever, and a collision surface for generating a collision sound by making said end part of said cantilever collide therewith are provided on the other one of said tool body and said extended part; and when said tool body is moved in a direction toward said extended part, said end part of said cantilever is displaced by said guide in a direction intersecting with said direction of movement, and when said end part of said cantilever disengages from said guide, said end part collides with said collision surface due to elastic force of said cantilever and generates a collision sound.

9. An optical connector cleaning method comprising:

pressing a cleaning element against an optical connector using a head of an extended part of an optical connector cleaning tool, wherein said extended part extends from a tool body of the optical connector cleaning tool and is movable with respect to said tool body;

converting relative linear motion between said tool body and said extended part into rotary motion;

taking up, with a take-up reel of the optical connector cleaning tool, in accordance with the movement of said tool body with respect to said extended part, said cleaning element which has been sent out from said head;

transmitting rotary force of the rotary motion to said take-up reel by friction between a friction member and a friction surface and maintaining constant the take-up amount of said take-up reel per single cleaning operation;

pressing said cleaning element against said optical connector with said head; and cleaning the optical connector with said cleaning element by moving said tool body toward said extended part in a state where said cleaning element is pressed against said optical connector with said head.

* * * * *